United States Patent
Isono

(10) Patent No.: US 6,347,842 B1
(45) Date of Patent: Feb. 19, 2002

(54) BRAKING HYDRAULIC PRESSURE SOURCE APPARATUS WHEREIN ASSISTING PRESSURE IS ELECTRICALLY CONTROLLED TO ESTABLISH PREDETERMINED OVERALL BOOSTING RATIO

(75) Inventor: Hiroshi Isono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/481,365

(22) Filed: Jan. 11, 2000

(30) Foreign Application Priority Data

| Jan. 11, 1999 | (JP) | 11-004241 |
| Apr. 30, 1999 | (JP) | 11-123604 |
| Jun. 30, 1999 | (JP) | 11-184816 |

(51) Int. Cl.$^7$ ............................................. B60T 8/44
(52) U.S. Cl. .................................. 303/114.1; 188/356
(58) Field of Search ........................ 303/114.1, 114.2, 303/114.3, 113.3; 188/356, 357, 358, 359, 355

(56) References Cited

U.S. PATENT DOCUMENTS

| 4,629,258 A | * 12/1986 | Resch et al. ............... 303/92 |
| 4,674,805 A | * 6/1987 | Leiber ...................... 303/114 |
| 4,678,243 A | * 7/1987 | Leiber ...................... 303/114 |
| 4,728,155 A | * 3/1988 | Resch ....................... 303/114 |
| 4,914,917 A | 4/1990 | Schonlau |
| 5,044,700 A | 9/1991 | Willmann |
| 5,217,281 A | * 6/1993 | Fujimoto ................... 303/9.63 |
| 5,531,509 A | 7/1996 | Kellner et al. |
| 5,549,361 A | 8/1996 | Sorenson |
| 5,588,718 A | * 12/1996 | Winner et al. .......... 303/113.1 |
| 5,709,438 A | 1/1998 | Isakson et al. .......... 303/113.4 |
| 6,039,411 A | * 3/2000 | Tozu et al. ............. 303/116.1 |
| 6,053,582 A | 4/2000 | Ganzel |
| 6,059,380 A | * 5/2000 | Pueschel et al. ........ 303/113.2 |
| 6,065,815 A | * 5/2000 | Terazawa et al. ....... 303/116.2 |
| 6,135,577 A | * 10/2000 | Ishii ....................... 303/114.1 |
| 6,142,583 A | * 11/2000 | Steffes ................... 303/114.1 |
| 6,196,641 B1 | * 3/2001 | Oka et al. .............. 303/114.1 |

FOREIGN PATENT DOCUMENTS

| DE | 00372898 A1 | * 3/1989 | ............. 303/114.1 |
| DE | 197 03 776 | 8/1998 | |
| GB | 2120333 A | * 11/1983 | ............. 303/114.1 |
| GB | 2184506 A | * 6/1987 | ............. 303/114.1 |
| GB | 2186335 A | * 8/1987 | ............. 303/114.1 |
| GB | 21960762 A | * 4/1988 | ............. 303/114.1 |
| JP | A-57-186571 | 11/1982 | |
| JP | 2-169355 | 6/1990 | |
| JP | B2-3-52376 | 3/1991 | |
| JP | A-4-5159 | 1/1992 | |
| JP | A-4-31160 | 2/1992 | |
| JP | A-4-50069 | 2/1992 | |
| JP | A-4-32864 | 11/1992 | |
| JP | B2-5-49509 | 3/1993 | |
| JP | B2-6-9963 | 1/1994 | |

* cited by examiner

Primary Examiner—Douglas C. Butler
Assistant Examiner—Xuan Lan Nguyen
(74) Attorney, Agent, or Firm—Kenyon & Kenyon

(57) ABSTRACT

A hydraulic pressure source apparatus for a braking system, including a cylinder housing, a pressurizing piston fluid-tightly and slidably received within the cylinder housing and cooperating with the cylinder housing to define a front pressurizing chamber and a rear assisting pressure chamber on respective front and rear sides of the pressurizing piston, so that the pressurizing piston is advanced in response to an operation of a brake operating member, to pressurize a working fluid in the front pressurizing chamber, and an electrically controlled assisting pressure control device (64) for controlling an assisting hydraulic pressure in the rear assisting pressure chamber, such that a boosting ratio which is a ratio of an output to an input of the pressurizing piston is controlled to be a predetermined value.

18 Claims, 10 Drawing Sheets

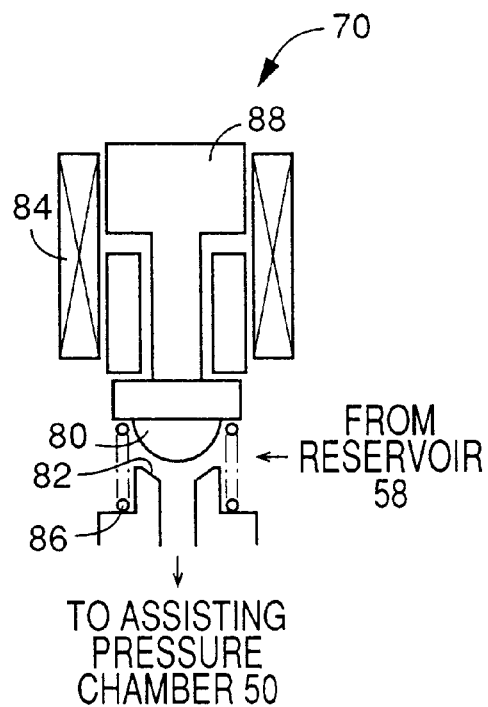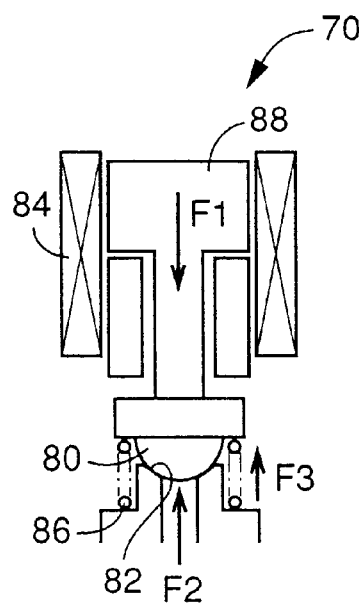
FIG. 2A [WHEN SOLENOID COIL 84 IS OFF]
FIG. 2B [WHEN SOLENOID COIL 84 IS ON]
FIG. 3
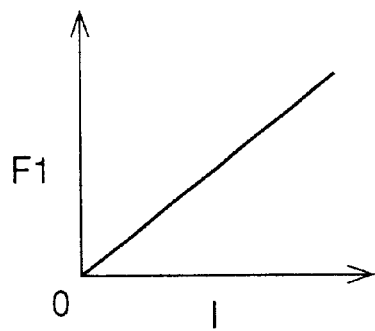

BRAKING HYDRAULIC PRESSURE SOURCE APPARATUS WHEREIN ASSISTING PRESSURE IS ELECTRICALLY CONTROLLED TO ESTABLISH PREDETERMINED OVERALL BOOSTING RATIO

This application is based on Japanese Patent Applications No. 11-4241 filed Jan. 11, 1999, No. 11-123604 filed Apr. 30, 1999 and No. 11-184816 filed Jun. 30, 1999, the content of which is incorporated hereinto by reference.

BACKGROUND OF THE INVENTION

1. Field of the Invention

The present invention relates in general to a hydraulically operated braking system, and more particularly to a hydraulic pressure source apparatus for a hydraulically operated braking system.

2. Discussion of the Related Art

JP-A-2-169355 discloses a braking hydraulic pressure source apparatus including (1) a cylinder housing, (2) a pressurizing piston fluid-tightly and slidably received in the cylinder housing and cooperating with the cylinder housing to define a front pressurizing chamber and a rear assisting pressure chamber on respective front and rear sides of the pressurizing piston, the pressurizing piston being advanced in response to an operation of a brake operating member by an operator, to pressurize a working fluid in the front pressurizing chamber, and (3) an assisting pressure control device for controlling a pressure of the working fluid in said rear assisting pressure chamber (hereinafter referred to as "assisting hydraulic pressure").

Where this braking hydraulic pressure source apparatus is used in a hydraulically operated braking system for an automotive vehicle, the working fluid in the rear assisting pressure chamber is pressurized to develop the assisting hydraulic pressure, so that the braking system performs a traction control for a drive wheel of the vehicle. Described in detail, the traction control is initiated without an operation of the brake operating member by the vehicle operator, with the assisting hydraulic pressure being applied to the rear assisting pressure chamber by the assisting pressure control valve, in response to a signal indicating an excessive amount of traction force acting on the drive wheel, so that the pressurizing piston is advanced to pressurize the working fluid in the front pressurizing chamber. As a result, the working fluid in the front pressurizing chamber pressurized by the pressurizing piston is supplied to a wheel brake cylinder connected to the front pressurizing chamber, so that the pressure of the working fluid in the wheel brake cylinder is increased for braking the drive wheel. The fluid pressure in the wheel brake cylinder is controlled by a pressure control valve device, so as to regulate the traction force of the drive wheel such that the amount of slip of the drive wheel on the road surface is held within an optimum range.

SUMMARY OF THE INVENTION

It is therefore a first object of the present invention to provide an improved braking hydraulic pressure source apparatus having an assisting pressure chamber as described above.

A second object of this invention is to provide a hydraulically operated braking system equipped with such an improved braking hydraulic pressure source apparatus.

The first or second object indicated above may be achieved by any one of the following modes of the present invention, each of which is numbered like the appended claims and depends from the other mode or modes, where appropriate, so as to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking hydraulic pressure source apparatus comprising: a cylinder housing; a pressurizing piston fluid-tightly and slidably received within the cylinder housing and cooperating with the cylinder housing to define a front pressurizing chamber and a rear assisting pressure chamber on respective front and rear sides of the pressurizing piston, the pressurizing piston being advanced in response to an operation of a brake operating member, to pressurize a working fluid in the front pressurizing chamber; and an electrically controlled assisting pressure control device for controlling an assisting hydraulic pressure which is a pressure of the working fluid in the rear assisting pressure chamber, such that a boosting ratio which is a ratio of an output of the pressurizing piston to an input of the pressurizing piston is controlled to be a predetermined value.

In the braking hydraulic pressure source apparatus, the pressurizing piston receives a primary drive force based on an operating force acting on the brake operating member, and an assisting drive force based on the assisting hydraulic pressure in the rear assisting pressure chamber. As a result, the pressurizing piston is advanced by a sum of these primary and assisting drive forces, and the working fluid in the front pressurizing chamber is pressurized to a value corresponding to the above-indicated sum. Where the brake operating member is directly connected to the pressurizing piston, the primary drive force is substantially equal to the operating force applied to the brake operating force by an operator. Where a booster is provided between the brake operating member and the pressurizing piston, the primary drive force is an output force of the booster which boosts the operating force applied to the brake operating member.

When the primary drive force is held constant, an increase of an assisting force by increasing the assisting hydraulic pressure results in an increase of the boosting ratio, and a reduction of the assisting force by reducing the assisting hydraulic pressure results in a reduction of the boosting ratio. Thus, the boosting ratio of the braking hydraulic pressure source apparatus can be controlled by controlling the assisting hydraulic pressure in the rear assisting pressure chamber. In the braking hydraulic pressure source apparatus according to the above mode (1) of this invention, the assisting hydraulic pressure is electrically controlled by the electrically controlled assisting pressure control device, such that the boosting ratio is controlled to be the predetermined value. This predetermined value may be either a constant value irrespective of the input and output of the pressurizing piston, or a variable which changes in steps or continuously depending upon the input and output of the pressurizing piston. In the present braking hydraulic pressure source apparatus, the boosting ratio is controlled to be the predetermined value. However, the principle of the present invention does not exclude a control of the boosting ratio depending upon the operating state of the brake operating member, the operating condition of a braking system for which the present braking hydraulic pressure source apparatus is used, and the running condition of an automotive vehicle on which the braking system is provided.

In the conventional braking hydraulic pressure source apparatus, the assisting hydraulic pressure is controlled while the braking system is performing a traction control for a drive wheel, without an operation of the brake operating member. However, the conventional braking hydraulic pressure source apparatus is not adapted to control the assisting hydraulic pressure during an operation of the brake operating member for effecting a normal braking operation. In the present braking hydraulic pressure source apparatus, the assisting hydraulic pressure is controlled at least during a normal braking operation of the braking system with an operation of the brake operating member. This is a departure from the conventional concept, based on a finding of a new application of the assisting pressure chamber for improved performance of the braking hydraulic pressure source apparatus.

As discussed above, the input of the pressurizing piston is boosted into its output by electric control of the assisting hydraulic pressure by the assisting pressure control device, so that the assisting pressure chamber as an assisting pressure chamber and the electrically controlled assisting pressure control device may be considered to provide an electrically controlled booster device. It is noted that the cylinder housing and the pressurizing piston may be a housing of a master cylinder and a pressurizing piston disposed in this master cylinder housing.

(2) A braking hydraulic pressure source apparatus according to the above mode (1), wherein the assisting pressure control device includes an output-pressure-dependent pressure control device for controlling the assisting hydraulic pressure in the rear assisting pressure chamber on the basis of a pressure of the working fluid in the front pressurizing chamber.

As described below in DETAILED DESCRIPTION OF THE PREFERRED EMBODIMENT, there is a predetermined relationship between the assisting hydraulic pressure and the pressure of the fluid in the front pressurizing chamber (hereinafter referred as "output hydraulic pressure" of the pressurizing piston), in the braking hydraulic pressure source apparatus according to the above mode (1) of the present invention in which the boosting ratio is controlled to be the predetermined value. Where the predetermined value of the boosting ratio is a predetermined constant value, for instance, the output hydraulic pressure of the pressurizing piston has a proportional relationship with the assisting hydraulic pressure. Based on this proportional relationship and the output hydraulic pressure, the assisting hydraulic pressure can be controlled to establish the predetermined boosting ratio.

(3) A braking hydraulic pressure source apparatus according to the above mode (1) or (2), wherein the assisting pressure control device includes a pressure increasing and reducing device for increasing the assisting hydraulic pressure if the assisting hydraulic pressure is lower than a desired value corresponding to a pressure of the working fluid in the front pressurizing chamber, and reducing the assisting hydraulic pressure if the assisting hydraulic pressure is higher than the desired value.

When the assisting hydraulic pressure is higher than a desired value corresponding to the output hydraulic pressure of the pressurizing piston, the boosting ratio is lower than when the assisting hydraulic pressure is lower than the above-indicated desired value. Therefore, when the assisting hydraulic pressure is lower than the desired value, the boosting ratio can be increased toward the predetermined value by increasing the assisting hydraulic pressure. Conversely, when the assisting hydraulic pressure is higher than the desired value, the boosting ratio can be reduced toward the predetermined value by reducing the assisting hydraulic pressure. Thus, the boosting ratio can be controlled to be the predetermined value by increasing or reducing the assisting hydraulic pressure depending upon whether the assisting hydraulic pressure is lower or higher than the desired value which corresponds to the fluid pressure in the front pressurizing chamber or the output hydraulic pressure of the pressurizing piston.

(4) A braking hydraulic pressure source apparatus according to the above mode (3), wherein the assisting pressure control device further includes a pressure holding device for holding the assisting hydraulic pressure if the assisting hydraulic pressure is almost equal to the desired value.

When the assisting hydraulic pressure is almost equal to the desired value corresponding to the output hydraulic pressure of the pressurizing piston, the boosting ratio is almost equal to the predetermined value. In this instance, the assisting hydraulic pressure need not be increased or reduced, and is therefore held at the present value.

(5) A braking hydraulic pressure source apparatus according to the above mode (1) or (2), wherein the assisting pressure control device further includes a pressure increasing and reducing device for increasing the assisting hydraulic pressure if a pressure of the working fluid in the front pressurizing chamber is higher than a desired value by more than a predetermined first amount, and reducing the assisting hydraulic pressure if the pressure of the working fluid in the front pressurizing chamber is lower than the desired value by more than a predetermined second amount, the desired value being determined by an actual value of the assisting hydraulic pressure and the predetermined value of the boosting ratio.

When the output hydraulic pressure of the pressurizing piston is higher than the desired value determined by the relationship between the desired assisting hydraulic pressure and the predetermined value of the boosting ratio, the actual assisting hydraulic pressure is lower than its desired value, and the actual boosting ratio is lower than the predetermined desired value. When the output hydraulic pressure is lower than the desired value, the actual assisting hydraulic pressure is higher than the desired value. The boosting ratio can be changed toward the desired value by increasing the assisting hydraulic pressure when the output hydraulic pressure is considerably higher than the desired value, and reducing the assisting hydraulic pressure when the output hydraulic pressure is considerably lower than the desired value.

(6) A braking hydraulic pressure source apparatus according to the above mode (5), wherein the assisting pressure control device further includes a pressure holding device for holding the assisting hydraulic pressure if the pressure of the fluid in the front pressurizing chamber is in a range determined by the desired value thereof and the predetermined first and second amounts.

When the output hydraulic pressure of the pressurizing chamber is close to the desired value, the boosting ratio is almost equal to the predetermined desired value, and the assisting hydraulic pressure is held at the present value.

(7) A braking hydraulic pressure source apparatus according to any one of the above modes (1)–(6), wherein the assisting pressure control device includes an output-change-rate- dependent pressure control device for controlling the assisting hydraulic pressure on the basis of a rate of change of the pressure of the working fluid in the front pressurizing chamber.

The output hydraulic pressure of the pressurizing piston changes with an increase in the brake operating force applied to the brake operating member by the operator, if the assisting hydraulic pressure is held constant. The rate of change of the output hydraulic pressure changes with a rate of change of the brake operating force. Accordingly, by controlling the assisting hydraulic pressure on the basis of the rate of change of the output hydraulic pressure, the assisting hydraulic pressure is controlled according to the rate of change of the brake operating force, so that the actual boosting ratio of the braking hydraulic pressure source apparatus can be suitably controlled to approach the predetermined value.

Where the feature according to the above mode (7) is provided in the braking hydraulic pressure source apparatus according to any one of the above modes (3)–(6), the assisting hydraulic pressure is increased or reduced depending upon the rate of change of the output hydraulic pressure, namely, the pressure of the fluid in the front pressurizing chamber.

(8) A braking hydraulic pressure source apparatus according to any one of the above modes (1)–(7), wherein the assisting pressure control device includes an output-change-rate- dependent assisting pressure change rate control device for controlling a rate of change of the assisting hydraulic pressure on the basis of a rate of change of the pressure of the working fluid in the front pressurizing chamber.

When the assisting hydraulic pressure is controlled to change at a rate corresponding to a rate of change of the output hydraulic pressure, the assisting hydraulic pressure is changed at a rate corresponding to a rate of change of the brake operating force, so that the boosting ratio can be controlled with particularly high stability.

(9) A braking hydraulic pressure source apparatus according to any one of the above modes (1)–(8), wherein the assisting pressure control device includes an assisting pressure change rate control device for controlling a rate of change of the assisting hydraulic pressure such that the rate of change of the assisting hydraulic pressure is held at a predetermined constant value while the rate of change of the pressure of the working fluid in the front pressurizing chamber is held in a predetermined range, and such that the rate of change of the assisting hydraulic pressure changes with the rate of change of the pressure in the front pressurizing chamber while the rate of change of the pressure of the working fluid in the front pressurizing chambers is not in the predetermined rate.

In the braking hydraulic pressure source apparatus according to the above mode (9), the rate of change of the assisting hydraulic pressure is held at a predetermined constant value if the rate of change of the output hydraulic pressure is in a predetermined range, for instance, in a range higher than a predetermined first positive value or lower than a predetermined second positive value. One example of the latter case will be described below with respect to the mode (10) of this invention. In one example of the former case, the rate of change of the assisting hydraulic pressure while the rate of change of the output hydraulic pressure is higher than the predetermined first positive value is made lower than a value which corresponds to the rate of change of the pressure of the fluid in the front pressurizing chamber. The rate of change of the assisting hydraulic pressure may be made constant where the. rate of change of the output hydraulic pressure is in a predetermined range higher than a predetermined third negative value or lower than a predetermined fourth negative value.

Where the feature according to the above mode (9) is provided in the braking hydraulic pressure source apparatus according to any one of the above modes (3)–(6), the rate of change of the assisting hydraulic pressure while the rate of change of the output hydraulic pressure is not in the predetermined range is controlled on the basis of the rate of change of the output hydraulic pressure.

(10) A braking hydraulic pressure source apparatus according to the above mode (9), wherein the rate of change of the assisting hydraulic pressure while the rate of change of the pressure of the working fluid in the front pressurizing chamber is lower than a predetermined value is made higher than a value which corresponds to the rate of change of the pressure of the working fluid in the front pressurizing chamber.

In the braking hydraulic pressure source apparatus according to the above mode (10), the rate of change of the assisting hydraulic pressure while the rate of change of the output hydraulic pressure is lower than a predetermined value is made higher than a value which corresponds to the rate of change of the output hydraulic pressure, the assisting hydraulic pressure can be changed so as to cause the boosting ratio of the braking hydraulic pressure source apparatus to approach the predetermined value, even if the rate of change of the output hydraulic pressure is relatively low.

Where the feature according to the above mode (10) is provided in the braking hydraulic pressure source apparatus according to any one of the above modes (4)–(6), the assisting hydraulic pressure is changed at the predetermined rate so that the boosting ratio is rapidly changed toward the predetermined value, even when the output hydraulic pressure is changed at a relatively low rate. Accordingly, the operation to increase or reduce the assisting hydraulic pressure can be rapidly changed into the operation to hold the assisting hydraulic pressure. That is, even while the input force applied to the pressurizing piston is increased considerably slowly, the assisting hydraulic pressure can be efficiently controlled to be held at a constant value corresponding to the predetermined value of the boosting ratio. Accordingly, frequent operations to increase and reduce the assisting hydraulic pressure before the predetermined boosting ratio has been reached can be avoided.

(11) A braking hydraulic pressure source apparatus according to any one of the above modes (1)–(10), wherein the assisting pressure control device comprises an electrically operated hydraulic power source including a hydraulic pump connected to the rear assisting pressure chamber, and an electric motor for driving the hydraulic pump.

In the braking hydraulic pressure source apparatus according to the above mode (11), the pressurized fluid is delivered from the hydraulic pump to the rear assisting pressure chamber to increase the assisting hydraulic pressure.

Where the electrically operated hydraulic power source is arranged such that the rate of flow of the pressurized fluid delivered from the hydraulic pump is controllable, the rate of increase of the assisting hydraulic pressure in the rear assisting pressure chamber can be controlled by controlling the electrically operated hydraulic pressure source apparatus. Where the electrically operated hydraulic power source is arranged so as to suitably permit the fluid flows into and from the rear assisting pressure chamber, the assisting hydraulic pressure can be increased or reduced by controlling the valve device. In this latter case, the hydraulic pump may be a gear pump, whose rotating directions are suitably selected so as to permit the fluid flows into and from the rear assisting pressure chamber.

(12) A braking hydraulic pressure source apparatus according to any one of the above modes (1)–(11), wherein the assisting pressure control device comprises a pressure control valve device including (a) a solenoid-operated pressure control valve for controlling the assisting hydraulic pressure in the rear assisting pressure chamber according to an electric current to be applied to the pressure control valve, and (b) a current control device for controlling the electric current to be applied to the solenoid-operated pressure control valve.

In the pressure control valve device provided according to the above mode (12), the assisting hydraulic pressure in the rear assisting pressure chamber can be controlled by controlling the electric current to be applied to the solenoid-operated pressure control valve. The pressure control valve may be either a shut-off valve which is selectively opened and closed with its solenoid coil being energized and de-energized so as to control the assisting hydraulic pressure, or a variable flow control valve adapted to control the rate of the fluid flow to the rear assisting pressure chamber depending upon the electric current applied to the solenoid coil. The pressure control valve device may include a plurality of solenoid-operated valves.

In either case, the feature according to the above mode (12) is preferably provided with the feature according to the above mode (11). Where the assisting hydraulic pressure is controllable by controlling the electric current to be applied to the solenoid-operated pressure control valve, the electrically operated hydraulic power source may be constructed to be simply able to deliver the pressurized fluid to the rear assisting pressure chamber at a constant flow rate, so that the cost of manufacture of the electrically operated hydraulic pressure source apparatus can be reduced. Since the assisting hydraulic pressure in the rear assisting pressure chamber can be increased by the pressurized fluid delivered from the hydraulic pump, the assisting hydraulic pressure can be controlled by providing the pressure control valve device with a single pressure reducing valve for reducing the assisting hydraulic pressure. In this case, the pressure control valve device using the single pressure reducing valve is available at a reduced cost.

(13) A braking hydraulic pressure source apparatus according to the above mode (12), wherein the solenoid-operated pressure control device includes a housing having a valve seat, a valve member movable toward and away from the valve seat, and an electromagnetic force generating device for generating an electromagnetic force acting on the valve member, depending upon an electric current to be applied to the electromagnetic force generating device, and wherein the current control device includes a device for increasing the electric current to be applied to the electromagnetic force generating device, at a predetermined rate while the rate of increase of the pressure of the working fluid in the rear assisting pressure chamber is lower than a predetermined lower limit.

In the solenoid-operated pressure control valve, the assisting hydraulic pressure may not be increased with an increase in the electric current applied to the electromagnetic force generating device, if the amount of increase of the electric current per each control cycle is considerably small. In view of this tendency, the amount of increase of the electric current per each control cycle is kept at a predetermined value as long as the rate of increase of the output hydraulic pressure is lower than the predetermined lower limit. That is, the amount of increase of the electric current is changed with an increase in the rate of increase of the output hydraulic pressure only while the rate of change of the output hydraulic pressure is not lower than the lower limit. According to this arrangement, the assisting hydraulic pressure can be changed even when the input force applied to the pressurizing piston is increased at a considerably low rate. The current control device may be adapted to reduce the electric current at a predetermined rate while the rate of reduction of the pressure of the working fluid in the rear assisting pressure chamber is lower than a predetermined lower limit.

The solenoid-operated pressure control valve may be a normally open valve or a normally closed valve. For instance, the solenoid-operated pressure control valve may be a normally open valve including a valve seat, a valve member, a spring for biasing the valve member in a direction for holding the valve member apart from the valve seat, and an electromagnetic forge generating device which generates an electromagnetic force corresponding to the electric current, such that the electromagnetic force acts on the valve member in a direction for moving the valve member toward the valve seat, as described below with respect to the presently preferred embodiment of this invention. Where this normally open solenoid-operated pressure control valve is disposed between the rear assisting pressure chamber and a reservoir, this valve functions as a pressure reducing valve for reducing the assisting hydraulic pressure in the rear assisting pressure chamber.

(14) A braking hydraulic pressure source apparatus according to any one of the above modes (1)–(13), further comprising a mechanically controlled booster interconnected between the brake operating member and the pressurizing piston, for boosting an operating force acting on the brake operating member, the booster having a mechanically operated control valve for controlling a pressure of a fluid by which the operating force is boosted so that the boosted operating force is applied to the pressurizing piston.

In the braking hydraulic pressure source apparatus according to the above mode (14), the output force of the mechanically controlled booster is the input to the pressurizing piston. The mechanically controlled booster is distinguished from an electrically controlled booster, which is provided in the braking hydraulic pressure source apparatus according to any one of the above modes (1)–(13). That is, the electrically controlled booster is constituted by the pressurizing piston and the electrically controlled assisting pressure control device adapted to control the assisting hydraulic pressure in the rear assisting pressure chamber formed on the rear side of the pressurizing piston. The mechanically controlled booster may be a vacuum booster or a hydraulic booster as well known in the art. In the braking hydraulic pressure source apparatus according to the above mode (14), the mechanically controlled booster and the electrically controlled booster are disposed in series connection with each other between the brake operating member and the pressurizing piston, so that the operating force applied to the brake operating member by the operator is boosted by both of the mechanically and electrically controlled boosters. Therefore, the overall boosting ratio of this pressure source apparatus can be made higher than the boosting ratio of a pressure source device using only the mechanically controlled booster, in particular, a vacuum booster. Further, the present apparatus can be comparatively easily adapted to provide the desired boosting characteristic.

(15) A braking hydraulic pressure source apparatus according to any one of the above modes (1)–(14), wherein the assisting pressure control device includes a device for initiating an operation to control the assisting hydraulic pressure in the rear assisting pressure chamber when the pressure of the working fluid in the front pressurizing chamber has been increased to a predetermined control initiating threshold value.

In the braking hydraulic pressure source apparatus, the operation of the assisting pressure control device is initiated when the fluid pressure in the front pressurizing chamber has been increased to the predetermined control initiating threshold value. Where the mechanically controlled booster described above with respect to the above mode (14) is provided, the assisting pressure control device is activated when the fluid pressure in the front pressurizing chamber has been increased to a value which is to be detected when the boosting limit of the booster has been reached. However, the threshold value may be higher or lower than the above-indicated value corresponding to the boosting limit. The threshold value may be zero. In this case, the operation of the assisting pressure control device to control the assisting hydraulic pressure is initiated when the brake operating member is operated by the operator.

(16) A braking hydraulic pressure source device according to any one of the above modes (1–15, wherein the assisting pressure control device includes a pressure control mode selecting portion for selecting a pressure increase mode when the assisting hydraulic pressure is lower than a desired value corresponding to the pressure of the working fluid in the front pressurizing chamber, a pressure reduction mode when the assisting hydraulic pressure is higher than the desired value, and a pressure hold mode when the assisting hydraulic pressure is almost equal to the desired value, the assisting pressure control device further including a pressure control portion for increasing and reducing the assisting hydraulic pressure when the pressure increase and reduction modes are selected, respectively, so that the pressure increase and reduction modes are changed to the pressure hold mode, the pressure control portion reducing the assisting hydraulic pressure when the pressure reduction mode is selected.

(17) A braking hydraulic pressure source apparatus comprising: a cylinder housing; a pressurizing piston fluid-tightly and slidably received with in the cylinder housing and cooperating with the cylinder housing to define a front pressurizing chamber and a rear assisting pressure chamber on respective front and rear sides of the pressurizing piston, the pressurizing piston being advanced in response to an operation of a brake operating member, to pressurize a working fluid in the front pressurizing chamber; and an electrically controlled assisting pressure control device for controlling an assisting hydraulic pressure which is a pressure of the working fluid in the rear assisting pressure chamber, such that a boosting ratio which is a ratio of an output of the pressurizing piston to an operating force acting on the brake operating member.

In the braking hydraulic pressure source apparatus according to the above mode (17), the application of the brake operating force (operating force acting on the brake operating member) to the pressurizing piston is not essential. That is, the assisting pressure control device may be adapted to control the assisting hydraulic pressure on the basis of the brake operating force as detected by a suitable force sensor. In this case, the fluid pressure in the rear pressurizing chamber is increased to produce a braking force, as if the brake operating force actually applied to the pressurizing piston were boosted at the predetermined boosting ratio.

(18) A braking hydraulic pressure source apparatus comprising: a cylinder housing; a pressurizing piston fluid-tightly and slidably received with in the cylinder housing and cooperating with the cylinder housing to define a front pressurizing chamber and a rear assisting pressure chamber on respective front and rear sides of the pressurizing piston, the pressurizing piston being advanced in response to an operation of a brake operating member, to pressurize a working fluid in the front pressurizing chamber; and an electrically controlled assisting pressure control device for controlling an assisting hydraulic pressure which is a pressure of the working fluid in the rear assisting pressure chamber, on the basis of an amount of operation of the brake operating member.

In the braking hydraulic pressure source apparatus according to the above mode (18), the assisting hydraulic pressure in the rear assisting pressure chamber is controlled depending upon an amount of operation of the brake operating member by an operator. The amount of operation of the brake operating member may be represented by an operating stroke of the brake operating member, or an operating force acting on the brake operating member.

(19) A braking system for braking a wheel of an automotive vehicle, comprising: a braking hydraulic pressure source apparatus according to any one of the above modes (1)–(18); a wheel brake cylinder connected to said front pressurizing chamber of said braking hydraulic pressure source apparatus and operable for braking the wheel; and an independent pressure control device for controlling a pressure of the working fluid in said wheel brake cylinder, independently of the pressure of the working fluid in said front pressurizing chamber, and wherein the braking hydraulic pressure source apparatus includes an assisting pressure control pump connected to the rear assisting pressure chamber, and the independent pressure control device includes a reservoir for storing the working fluid discharged from the wheel brake cylinder, an independent pressure control pump for pressurizing the working fluid received from the reservoir, and an electric motor for driving the independent pressure control device, the electric motor being also used by the braking hydraulic pressure source apparatus, for driving the assisting pressure control pump.

The braking system according to the above mode (19) wherein the single electric motor is used for driving the assisting pressure control pump and the independent pressure control pump is available at a lower cost than a braking system wherein the two pumps are driven by respective electric motors.

(20) A braking system for braking a wheel of an automotive vehicle, comprising: a braking hydraulic pressure source apparatus including a (1) a cylinder housing, (2) a pressurizing piston fluid-tightly and slidably received within the cylinder housing and cooperating with the cylinder housing and cooperating with the cylinder housing to define a front pressurizing chamber and a rear assisting pressure chamber on respective front and rear sides of the pressurizing piston, the pressurizing piston being advanced in response to an operation of a brake operating member, to pressurize a working fluid in the front pressurizing chamber, and (3) an assisting pressure control pump connected to the rear assisting pressure chamber; a wheel brake cylinder connected to the front pressurizing chamber of the braking hydraulic pressure source apparatus and operable for braking the wheel; and an independent pressure control device for controlling a pressure of the working fluid in the wheel brake cylinder, independently of the pressure of the working fluid in the front pressurizing chamber, and wherein the independent pressure control device includes a reservoir for storing the working fluid discharged from the wheel brake cylinder, an independent pressure control pump for pressurizing the working fluid received from the reservoir, and an electric motor for driving the independent pressure control device, the electric motor being also used by the braking hydraulic pressure source apparatus, for driving the assisting pressure control pump.

In the braking system according to the above mode (20), the independent pressure control pump and the assisting pressure control pump are both driven by the same electric motor, and the cost of manufacture of the braking system having the rear assisting pressure chamber is made lower than that of a braking system wherein two electric motors are used to drive the respective two pumps. In this sense, the present braking system is an improvement over a braking system of the type as disclosed in JP-A-2-169355. The electric motor preferably has a capacity enough to permit simultaneous operations of the independent pressure control pump and the assisting pressure control pump.

The independent pressure control device may be adapted to include at least one of (a) an anti-lock braking pressure control device for controlling the fluid pressure in the wheel brake cylinder during an operation of the brake operating member such that the amount of slipping of the wheel is held in an optimum range, (b) a traction control device for controlling the fluid pressure in the wheel brake cylinder while the brake operating member is not in operation and while the wheel to be braked by the wheel brake cylinder is driven for running the automotive vehicle, such that the amount of slip of the drive wheel is held in an optimum range, and (c) a vehicle running stability control device for controlling the fluid pressure in the wheel brake cylinder to brake the wheel so as to increase the running stability of the vehicle.

The braking hydraulic pressure source apparatus in the braking system according to the above mode (20) may include any one of the technical features which have been described above with respect to the above modes (1)–(18).

(21) A braking system according to the above mode (19) or (20), wherein the braking hydraulic pressure source apparatus includes an assisting pressure control device for controlling an assisting hydraulic pressure which is a pressure of the working fluid in the rear assisting pressure chamber, by using the pressurized fluid delivered from the assisting pressure control pump, the braking system comprising an interference preventing device which permits an operation of the assisting pressure control device to control the assisting hydraulic pressure in the rear assisting pressure chamber and an operation of the independent pressure control device to control the pressure of the working fluid in the wheel brake cylinder, without an interference between the controls of the pressure in the rear assisting pressure chamber and the wheel brake cylinder by the assisting pressure control device and the independent pressure control device.

In the braking system according to the above mode (21), the control of the fluid pressure in the wheel brake cylinder by the independent pressure control device and the control of the assisting hydraulic pressure in the rear assisting pressure chamber by the assisting pressure control device can be effected without an interference with each other. For instance, the assisting pressure control device includes a pressure control valve which is capable of controlling the assisting hydraulic pressure without influencing the wheel brake cylinder pressure controlled by the independent pressure control device. The assisting pressure control pump may be kept operated even while the control of the assisting hydraulic pressure is unnecessary during an operation of the independent pressure control device to control the wheel brake cylinder pressure. In this case, the pressure control valve of the assisting pressure control device may be controlled to prevent an increase in the assisting hydraulic pressure in the rear assisting pressure chamber. Thus, the assisting pressure control device including the pressure control valve makes it possible to permit the controls of the assisting hydraulic pressure and the wheel brake cylinder pressure without an interference with each other. In this case, the pressure control valve may be considered to be the interference preventing device indicated above. The independent pressure control pump is kept operated even while the wheel brake cylinder pressure is not being controlled, as long as the assisting hydraulic pressure is being controlled, that is, as long as the electric motor is operated to drive the assisting pressure control pump. However, the independent pressure control pump may be adapted to be run without an actual pumping action when no fluid is stored in the reservoir as a result of the discharge flow of the fluid from the wheel brake cylinder into the reservoir. This arrangement prevents a control of the wheel brake cylinder pressure by the independent pressure control pump. In this case, the independent pressure control device which is run without an actual pumping action when no fluid is stored in the reservoir can be considered to be the interference preventing device.

BRIEF DESCRIPTION OF THE DRAWINGS

The above and optional objects, features, advantages and technical and industrial significance of this invention will be better understood and appreciated by reading the following detailed description of a presently preferred embodiment of the invention, when considered in connection with the accompanying drawings, in which:

FIGS. 2A and 2B are elevational views schematically illustrating a pressure control valve included in the braking system of FIG. 1;

FIG. 3 is a graph indicating a relationship between an electric current I applied to a solenoid coil of the pressure control valve of FIGS. 2A and 2B and an attraction force F1 produced by the solenoid coil;

DETAILED DESCRIPTION OF THE PREFERRED EMBODIMENT

Figure 1:
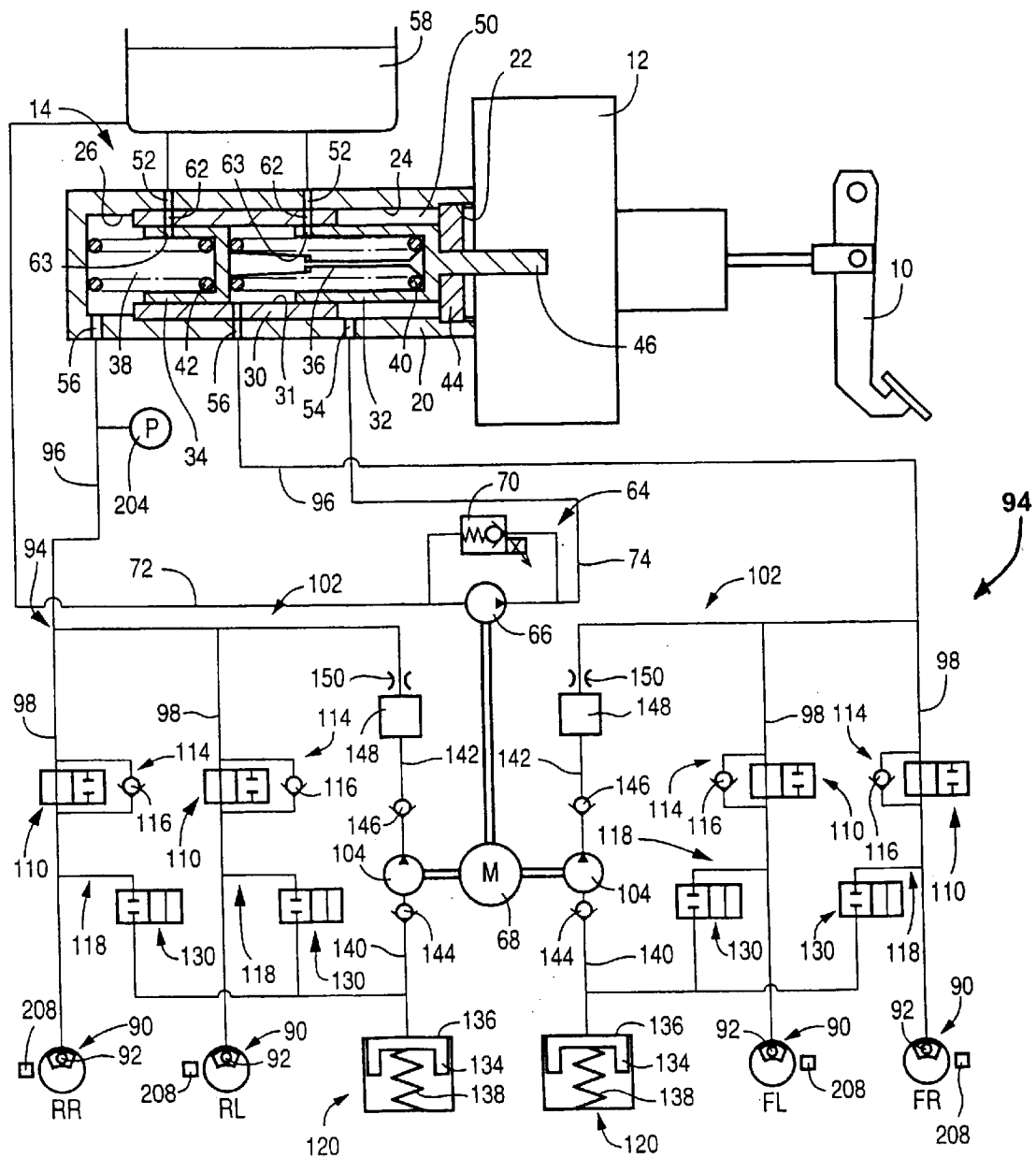
FIG. 1 is a schematic view of a hydraulically operated braking system including a hydraulic pressure source apparatus constructed according to one embodiment of this invention.

Referring first to FIG. 1, the hydraulically operated braking system shown therein is constructed according to one embodiment of this invention, for use on a four-wheel automotive vehicle having a left front wheel FL, a right front wheel FR, a left rear wheel RL and a right rear wheel PR. This braking system includes a braking operating member in the form of a brake pedal 10 connected to a tandem type master cylinder 14 through a vacuum booster 12, which is a mechanically operated booster.

As well known in the art, the vacuum booster 12 (hereinafter referred to simply as "booster 12") includes a power piston which partially defines a negative pressure chamber and a variable-pressure chamber on its opposite sides. The negative pressure chamber is connected to a suitable negative pressure source such as an intake manifold of an engine of the vehicle. The variable-pressure chamber is selectively communicated with the negative pressure chamber and the atmosphere. The power piston is moved by an operating force based on a difference between the pressures in the negative pressure chamber and the variable-pressure chamber, so that a brake operating force in the form of a depression force acting on the brake pedal 10 is boosted, for transmitting the boosted brake operating force to the master cylinder 14.

The master cylinder 14 has a cylindrical housing 20 which is closed at one of its opposite ends and open at the other end. The housing 20 has a first, a second and third cylindrical bore 22, 24, 26, which are arranged in this order of description as seen in the direction from the open end toward the closed end of the housing 20. The first and third bores 22, 26 have the largest and smallest diameters, respectively, while the second bore 24 has a diameter intermediate between the diameters of the first and third bores 22, 26.

In the second cylindrical bore 24, there is substantially fluid-tightly and slidably fitted a sleeve 30 such that the sleeve 30 is held at its end closer to the bottom of the housing 20, in abutting contact with an annular shoulder surface between the second and third cylindrical bores 24, 26, by a suitable fixing member such as a retainer ring, so that the sleeve 30 is prevented from being moved away from the above-indicated shoulder surface. The sleeve 30 has a cylindrical bore 31 in which are fitted a first pressurizing piston 32 and a second pressurizing piston 34 which are arranged in series with each other. Each of these two pressurizing pistons 32, 34 is closed at one of its opposite axial ends and open at the other axial end, and is substantially fluid-tightly and slidably received in the cylindrical bore 31, such that the inner surface of the bottom wall at the closed end of each pressurizing piston 32, 34 faces toward the bottom wall of the housing 30. Described in detail, the inner surface of the bottom wall and the inner circumferential surface of each pressurizing piston 32, 34 partially define the corresponding front pressurizing chamber 36, 38. Two biasing members in the form of two springs 40, 42 are disposed within the respective front pressurizing chambers 36, 38, so that the pressurizing pistons 32, 34 are biased toward their fully retracted positions of FIG. 1. The fully retracted position of the first pressurizing piston 32 is determined by a closure member 44 which will be described, while the fully retracted position of the second pressurizing piston 34 is determined by the fully retracted position of the first pressurizing piston 32, and an initial length and an initial load of the spring 40 disposed within the first front pressurizing chamber 36 which is partially defined by the first pressurizing piston 32.

The cylindrical housing 20 is substantially fluid-tightly closed at the open end by the closure member 44 which is fitted in the first cylindrical bore 22 such that the closure member 44 is held in abutting contact with an annular shoulder surface between the first and second cylindrical bores 22, 24. The closure member 44, the axial position of which is determined by the shoulder surface indicated above, is prevented from being removed from the housing 20, by a suitable fixing member such as a retainer ring. As indicated above, the fully retracted position of the first pressurizing piston 32 is determined by abutting contact of its rear end face with the closure member 44. The first pressurizing piston 32 has an auxiliary piston 46 which projects from its rear end face rearwardly into the booster 12, extending through the closure member 44 substantially fluid-tightly and slidably. The master cylinder 14 is activated with the auxiliary piston 46 receiving the output force of the power piston of the booster 12, so that masses of a working oil or liquid as a working fluid in the two front pressurizing chambers 36, 38 are pressurized to the same pressure value, on the basis of the output force of the booster 12.

The housing 20 and the closure member 44 fitted in the housing 20 cooperate with the first pressurizing piston 32 to define a rear assisting pressure chamber 50. When a fluid pressure is applied to this rear assisting pressure chamber 50, the first pressurizing piston 32 is advanced from its fully retracted position, whereby the fluid pressure in the first front pressurizing chamber 36 is increased, and as a result, the second pressurizing piston 34 is also advanced from its fully retracted position, so that the fluid pressure in the second front pressurizing chamber 38 is also increased.

The housing 20 has two reservoir ports 52, one assisting pressure control port 54 and two brake cylinder ports 56.

The two reservoir ports 52 are provided for communication of the two front pressurizing chambers 36, 38 with a reservoir 58 which stores the working fluid at the atmospheric pressure. These two reservoir ports 52 are formed through respective axial portions of the housing 20 which correspond to the respective two front pressurizing chambers 36, 38. Each of the reservoir ports 52 is held in communication with a communication passage 62 formed through the cylindrical wall of the sleeve 30 in the radial direction. Each of the pressurizing pistons 32, 34 has a communication passage 63 formed through its cylindrical wall in the radial direction. The communication passages 63 are positioned so that they communicate with the corresponding reservoir ports 52 and communication passages 62, when the pressurizing pistons 32, 34 are located at their fully retracted positions of FIG. 1. When each pressurizing piston 32, 34 is advanced by a small distance from its fully retracted position, the corresponding communication passage 63 is closed by the inner circumferential surface of the cylindrical bore 31 of the sleeve 30, while the corresponding communication passage 62 is closed by the outer circumferential surface of the pressurizing piston 32, 34, whereby the reservoir ports 52 are disconnected from the front pressurizing chambers 36, 38, so that the fluid pressure in these chambers 36, 38 can be raised as the pressurizing pistons 32, 34 are further advanced.

The assisting pressure control port 54 is formed through the cylindrical wall of the housing 20, at an axial position of the housing 20 at which the port 54 is always held in communication with the rear assisting pressure chamber 50, so that the rear assisting pressure chamber 50 is held in communication with an assisting pressure control device 64 through the assisting pressure control port 54. The assisting pressure control device 64 includes an assisting pressure control pump in the form of a pressure increasing pump 66, a pump motor 68 for driving the pump 66, and a pressure control valve (pressure reducing valve) 70. The pressure increasing pump 66 is connected on its suction side to the reservoir 58 through a reservoir passage 72 and on its delivery side to the assisting pressure control port 54 through a pump 74. The pump 66 pressurizes the fluid received from the reservoir 58, so that the pressurizing fluid is delivered from the pump 66 to the rear assisting pressure chamber 50. In the present embodiment, the pump motor 68 is also used for driving two independent pressure control pumps in the form of two anti-lock pressure control pumps 104 which will be described.

Referring to FIGS. 2A and 2B, there is shown in enlargement the pressure control valve 70, which is electromagnetically controlled to regulate the fluid pressure in the rear assisting pressure chamber 50. The pressure control valve 70 has a housing, a valve member 80, a valve seat 82 on which the valve member 80 is seated when needed, a solenoid coil 84 for generating an electromagnetic force for controlling a movement of the valve member 80 relative to the valve seat 82, and a spring 84 biasing the valve member 80 in a direction away from the valve seat 82. The valve member 80 cooperates with the valve seat 82 to regulate flows of the fluid between the rear assisting pressure chamber 50 and the reservoir 58.

When the solenoid coil 84 of the pressure control valve 70 is off or in a de-energized state, the pressure control valve 70 is placed in its open state of FIG. 2A with the valve member 80 being held apart from the valve seat 82 by a biasing force of the spring 86, whereby the fluid is permitted to flow in the opposite directions between the rear assisting pressure chamber 50 and the reservoir 58. In this open state of FIG. 2A, the fluid flows into and from the rear assisting pressure chamber 50 through the pressure control valve 70 are permitted as the volume of the rear assisting pressure chamber 50 is changed with a movement of the first pressurizing piston 32 during an operation of the brake pedal 10. In particular, the pressure control valve 70 which is normally open permits the fluid to be supplied from the reservoir 58 into the rear assisting pressure chamber 50 when the pressurizing piston 32 is advanced, so that the fluid pressure in the assisting pressure chamber 50 is prevented from being lowered below the atmospheric pressure.

When the solenoid coil 84 is on or in an energized state, an armature 88 disposed within the winding of the solenoid coil 84 and carrying the valve member 80 is moved toward the valve seat 82 by an electromagnetic force produced by the solenoid coil 84, so that the valve member 80 is seated on the valve seat 82, whereby the pressure control valve 70 is brought into its closed state of FIG. 2B. AT this time, an attraction force F1 based on the electromagnetic force of the solenoid coil 84 acts on the valve member 80 in the direction from the valve member 80 toward the valve seat 82, while a sum of a force F2 based on the fluid pressure in the rear assisting pressure chamber 50 and a biasing force of the spring 88 acts on the valve member 80 in the reverse direction. The force F2 is a product of the fluid pressure in the chamber 50 and an effective pressure-receiving surface area of the valve member 80 which receives the fluid pressure in the chamber 50.

The pressure control valve 70 is designed such that the attraction force F1 produced by the solenoid coil 84 linearly increases with an increase in an electric current I applied to the solenoid coil 84, as indicated in the graph of FIG. 3.

When a formula $F2 \leq F1-F3$ is satisfied when the solenoid coil 84 is on or in the energized state, the valve member 80 is seated on the valve seat 82, so that the fluid pressure in the rear assisting pressure chamber 50 can be increased with an increase of the delivery pressure of the pump 66. When an inequality $F2>F1-F3$ is satisfied as a result of a further increase in the fluid pressure in the chamber 50, the valve member 80 is moved away from the valve seat 82, permitting the fluid to be discharged from the chamber 50 into the reservoir 50, whereby the fluid pressure in the chamber 50 is reduced. The cross sectional area of fluid flow through a passage defined by and between the valve member 80 and the valve seat 82 can be controlled by controlling the electric current I to be applied to the solenoid coil 84. Thus, the rate at which the fluid pressure in the chamber 50 is increased or reduced can be controlled by controlling the electric current I.

Referring back to FIG. 1, the two brake cylinder ports 56 are formed through the cylindrical wall of the housing 20, at respective axial positions at which the ports 56 are always held in communication with the respective front pressurizing chambers 36, 38, so that the chambers 36, 38 are connected to the two mutually independent pressure application sub-systems of the braking system. Described more specifically, the braking system includes a front brake application sub-system including two front brakes 90 having respective two front wheel brake cylinders 92 for braking the respective left and right front wheels FL, FR, and a rear brake application sub-system including two rear brakes 90 having respective two rear wheel brake cylinders 92 for braking the respective left and right rear wheels RL, RR. Since there two brake application sub-systems are identical in construction with each other, only the front brake application sub-system will be described. It is to be understood that the description of the front brake application sub-system substantially applies to the rear brake application sub-system.

The first front pressurizing chamber 36 of the master cylinder 14 is connected through a main fluid passage 94 to the front wheel brake cylinders 92 for the left and right front wheels, FL, FR. The main fluid passage 94 includes a common passage 96 extending from the front pressurizing chamber 36, and two branch passages 98 each of which is connected at one end thereof to the common passage 96 and at the other end to the front wheel brake cylinders 92. A pump passage 102 is connected at one end thereof to the common passage 96, in parallel connection with the branch passages 98. This pump passage 102 is connected to the anti-lock pressure control pump 104 indicated above. The two anti-lock pressure control pumps 104, 104 of the front and rear brake application sub-systems are driven by the single common pump motor 68.

Figure 5:
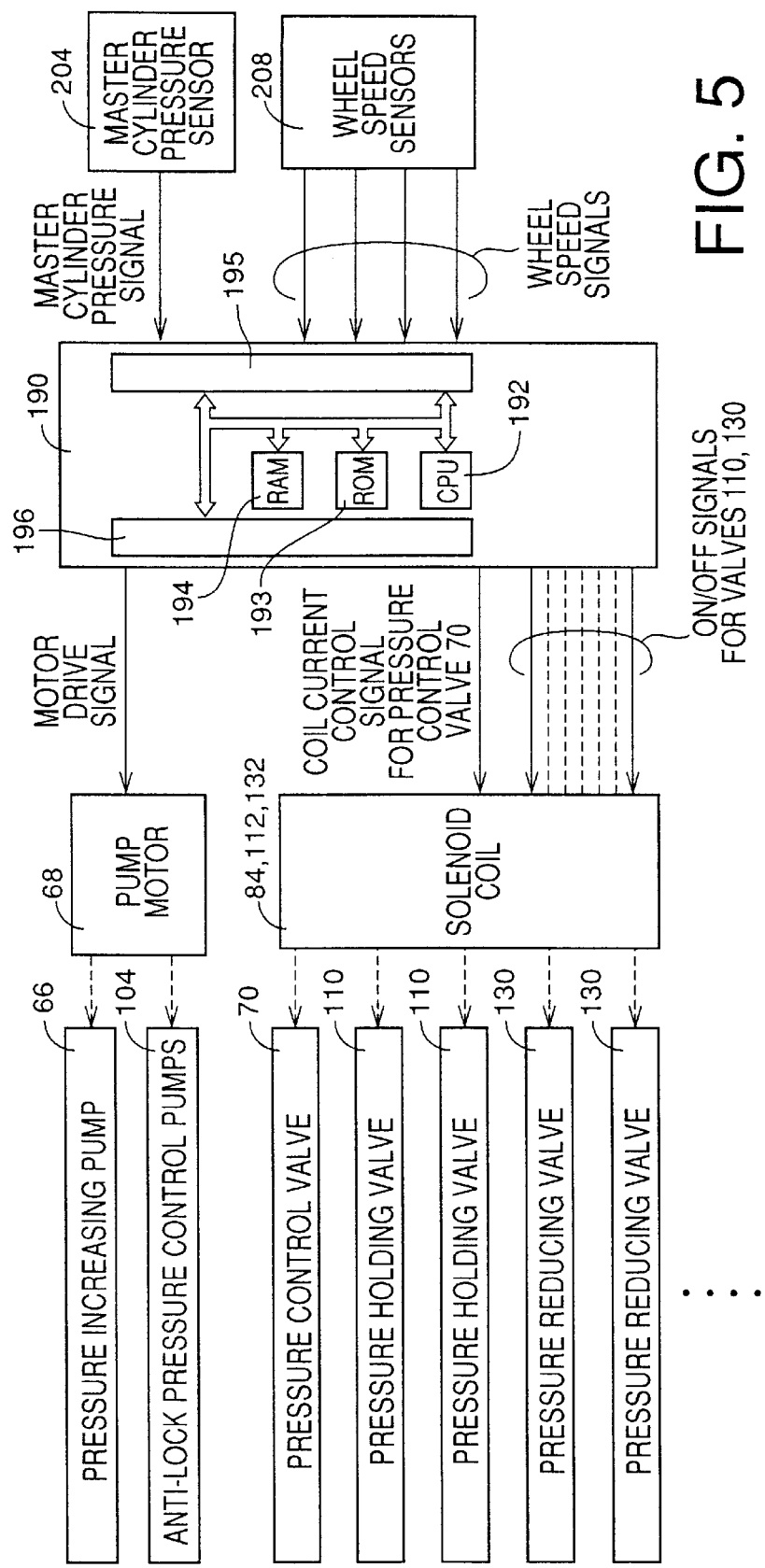
FIG. 5 is a block diagram illustrating an electrical arrangement of the braking system.

Each of the two branch passages 98 is provided with a pressure holding valve 110 which is a normally open solenoid-operated shut-off valve. When a solenoid coil 112 (FIG. 5) of the valve 110 is energized, the valve 110 is brought to a closed state, inhibiting the flow of the fluid in the direction from the anti-lock pressure control pump 104 toward the wheel brake cylinder 92, so that the fluid pressure in the wheel brake cylinder 92 can be held at the present level. A by-pass passage 114 is connected to each branch passage 98, so as to by-pass the pressure holding valve 110. The by-pass passage 114 is provided with a check valve 116 which permits a flow of the fluid in the direction from the wheel brake cylinder 92 toward the point of connection of the branch passage 98 to the common passage 96 and the pump passage 112, and inhibits the flow in the reverse direction.

A reservoir passage 118 is connected at one end thereof to a portion of each branch passage 98 between the pressure holding valve 110 and the wheel brake cylinder 92, and at the other end to a reservoir 120. The reservoir passage 118 is provided with a pressure reducing valve 130 which is a normally closed solenoid-operated shut-off valve. When a solenoid coil 132 (FIG. 5) of the pressure reducing valve 130 is energized, the valve 130 is brought to an open state, permitting the flow of the fluid from the wheel brake cylinder 92 into the reservoir 130, so that the fluid pressure in the wheel brake cylinder 92 is lowered or reduce.

The reservoir 120 has a housing and a piston 134 which is substantially fluid-tightly and slidably received within the housing and which cooperates with the housing to define a reservoir chamber 136. The reservoir 120 further has biasing means in the form of a spring 138 for biasing the piston 136 in a direction that reduces the volume of the reservoir chamber 136, so that the fluid is stored in the reservoir chamber 136 under pressure. The reservoir chamber 136 is connected to the main fluid passage 94 through the pump passage 102.

The pump passage 102 is divided by the anti-lock pressure control pump 104 into a suction passage 140 on the side of the reservoir 120 and a delivery passage 142 on the side of the points of connection of the branch passages 98 to the common passage 96. The suction and delivery passages 140, 142 are respectively provided with a suction valve 144 and a delivery valve 146, which are both check valves. The delivery passage 142 is further provided with a damper chamber 148 and a flow restrictor in the form of an orifice 150, which are connected in series with each other. These damper chamber 148 and orifice 150 function to reduce a pressure pulsation of the fluid pressurized by the anti-lock pressure control pump 104.

As described above, the pump motor 68 is provided for driving not only the two anti-lock pressure control pumps 104 but also the pressure increasing pump 66 of the assisting pressure control device 64. In the present embodiment, each of the anti-lock pressure control pumps 104 is a plunger pump, while the pressure increasing pump 66 is a gear pump.

Figure 4:
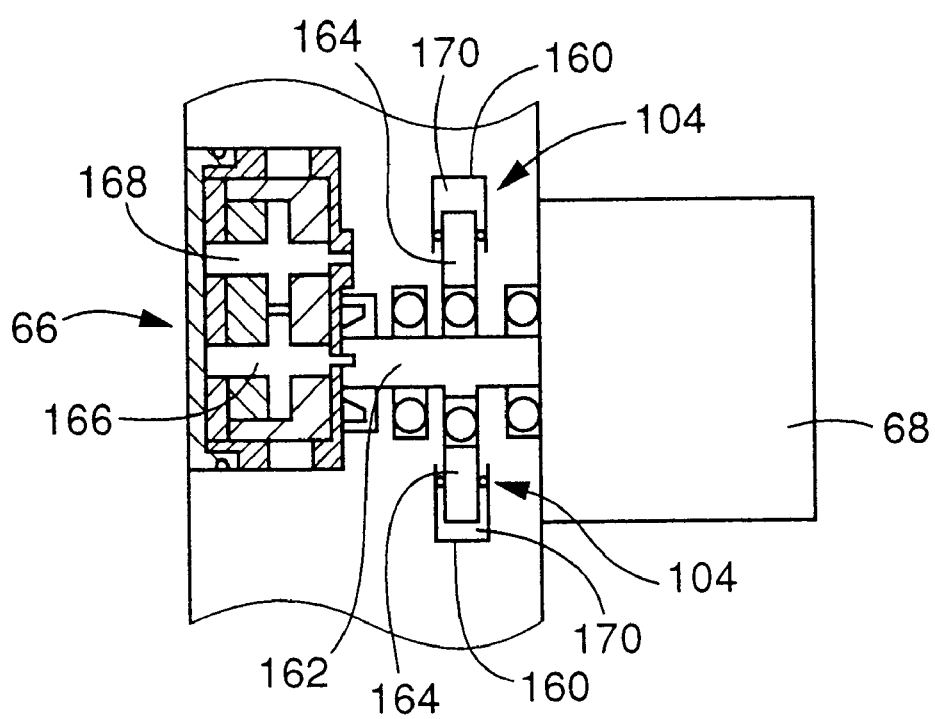
FIG. 4 is a view schematically illustrating a pressure increasing pump, anti-lock pressure control pumps, and a pump motor, which are provided in the braking system.

Referring to FIG. 4, each anti-lock pressure control pump 104 has a cylinder 160 to which are connected the suction and delivery passage 140, 142 (FIG. 1) that are provided with the respective suction and delivery valves 144, 146. To the suction and delivery ports of the pressure increasing pump 66, there are connected the reservoir and pump passages 72, 74, respectively.

As shown in FIG. 4, the pump motor 68 has an output shaft 162 which engages pistons 164 of the two anti-lock pressure control pumps 104 through an eccentric cam and which is connected to a gear 166 of the pressure increasing pump 66 such that the gear 166 is rotated with the output shaft 162. The gear 166 meshes with a gear 168. When the output shaft 162 of the pump motor 68 is rotated, the pistons 164 are reciprocated within the cylinder 160, and the gears 166, 168 are rotated. With a reciprocating movement of the piston 164 of each pump 104, the volume of a pump chamber 170 in the cylinder 170 is alternately increased and reduced. The piston 164 is forced against the eccentric cam under a biasing force of a spring, so that the reciprocating movement of the piston 164 in the opposite directions to alternately increase and reduce the volume of the pump chamber 170 takes place with the piston 164 being held in sliding contact with the eccentric cam under a pressure based on the biasing force of the spring. Thus, each anti-lock pressure control pump 104 performs a pumping action. On the other hand, the pressure increasing pump 66 performs a pumping action based on rotation of the meshing gears 166, 168, for delivering the pressurized fluid.

As described above, the two anti-lock pressure control pumps 104 and the pressure increasing pump 66 are driven by the common pump motor 68. If no fluid is sucked into the pump 104 through the suction passage 140, that is, if no fluid is stored in the reservoir 120, the piston 164 is held at its upper dead point at which the volume of the pump chamber 170 is the smallest, so that no pressurized fluid is delivered from the pump 104 into the wheel brake cylinders 92. Since the pressure control valve 70 is a normally open valve, the fluid pressurized by the pressure increasing pump 66 and delivered from its delivery port is returned to its suction port through the open pressure control valve 70, and is not delivered to the rear assisting pressure chamber 50 of the master cylinder 14, unless the solenoid coil 84 is energized with the electric current I.

As shown in the block diagram of FIG. 4, the present braking system uses an electronic control unit 190 (hereinafter abbreviated as "ECU 190"). This ECU 190, which is an element of the assisting pressure control device 64, is principally constituted by a computer incorporating a central processing unit (CPU) 192, a read-only memory (ROM) 193, a random-access memory (RAM) 194, an input portion 195 and an output portion 196. To the input portion 195 of the ECU 190, there are connected a master cylinder pressure sensor 204 and four wheel speed sensors 208. The master cylinder pressure sensor 204 is connected to the common passage 96 of the main fluid passage 94, for detecting the fluid pressure in the second front pressurizing chamber 38. The sensor 204 generates a signal indicative of this fluid pressure. The four wheel speed sensors 208 are provided for the respective four wheels FL, FR, RL, RR, and generate signals indicative of the rotating speeds of those wheels.

To the output portion 196 of the ECU 190, there are connected the pump motor 68 (for driving the pressure increasing pump motor 66 and the two anti-lock pressure control pumps 104), the solenoid coil 84 of the pressure control valve 70, the solenoid coil 112 of the pressure holding valve 110 and the solenoid coil 132 of the pressure reducing valve 130. The pump motor 68 is connected to the input portion 196 through a driver circuit including an inverter. The solenoid coils 84, 112, 132 are connected to the input portion 196 through respective driver circuits. In the present embodiment, the pump motor 68 is kept on as long as the brake pedal 10 is held operated.

Figure 6:
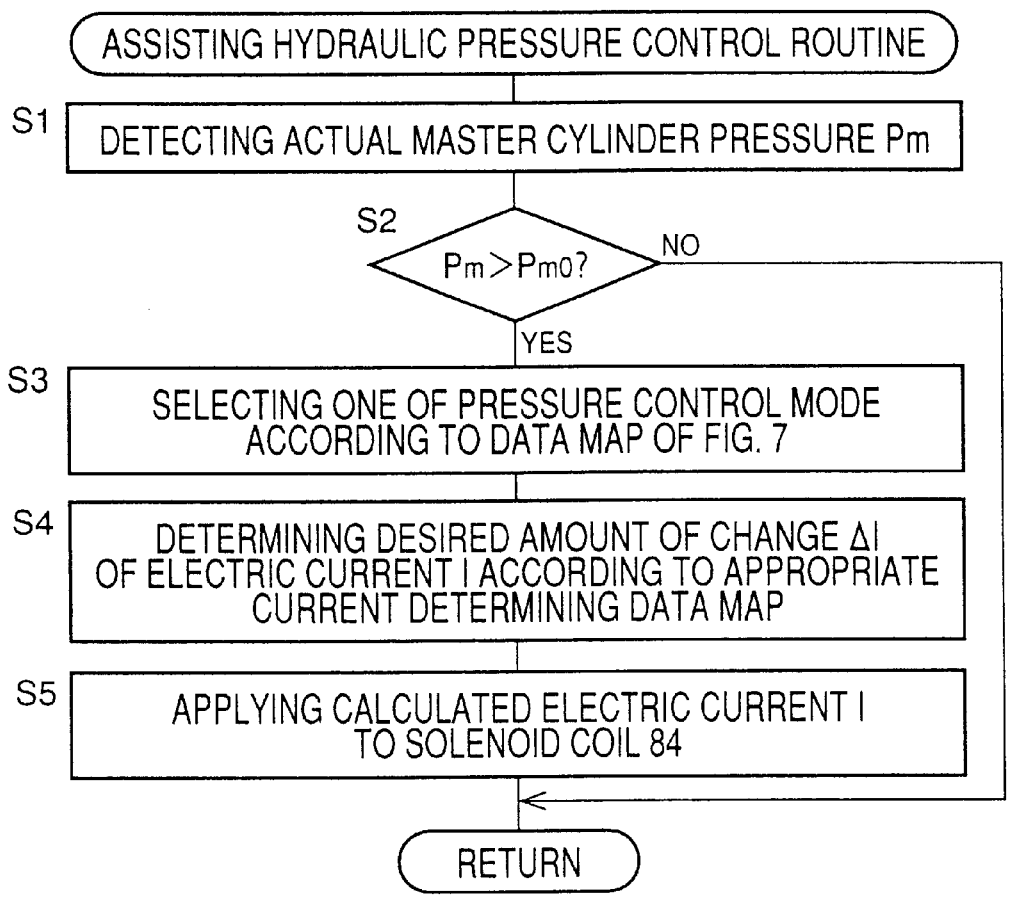
FIG. 6 is a flow chart illustrating an assisting hydraulic pressure control routine executed by an electronic control unit used in the braking system.
Figure 7:
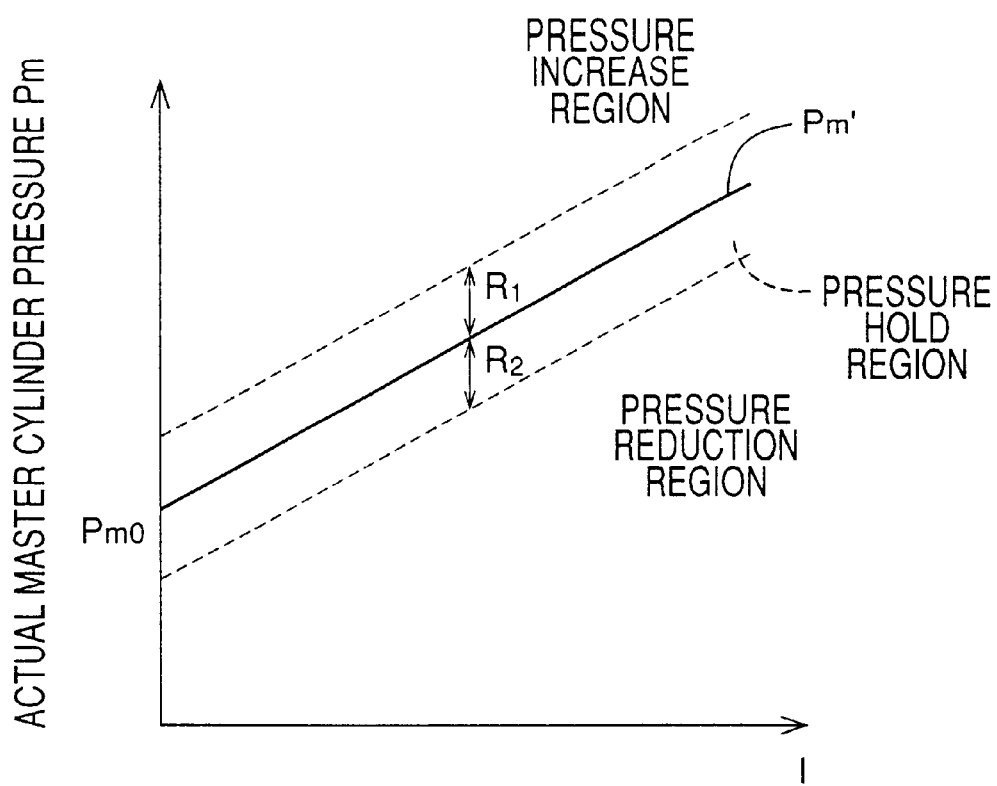
FIG. 7 is a graph indicating a data map for selecting an assisting pressure control mode, which data map is stored in a ROM of the electronic control unit.
Figure 8:
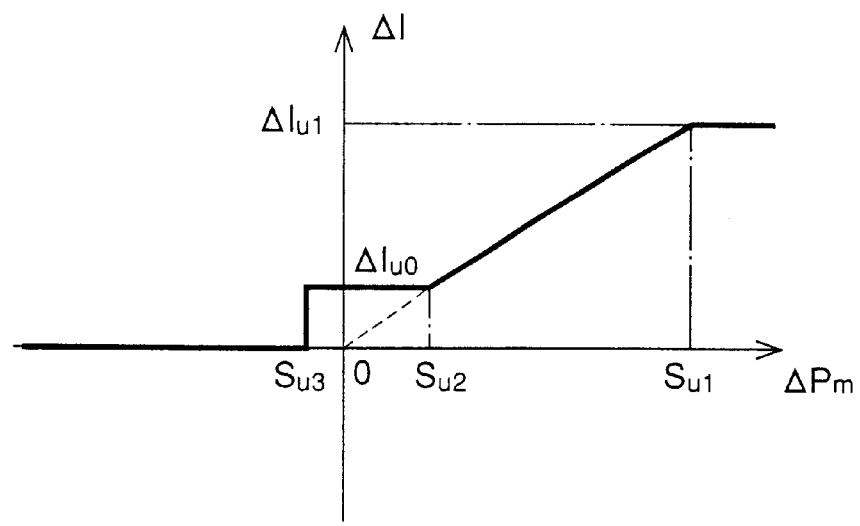
FIG. 8 is a graph indicating a data map for determining a desired amount of change of the electric current to be applied to the solenoid coil of the pressure control valve to increase the assisting hydraulic pressure, which data map is stored in the ROM.
Figure 9:
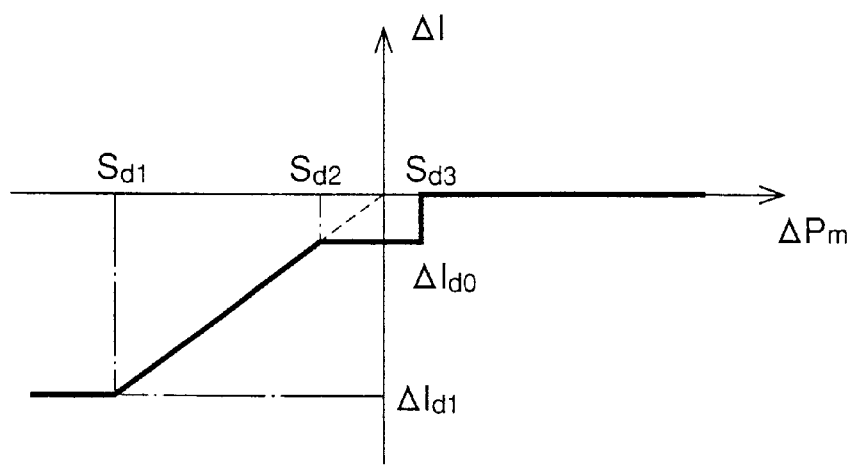
FIG. 9 is a graph indicating a data map for determining a desired amount of change of the electric current to be applied to the solenoid coil to reduce the assisting hydraulic pressure, which data map is stored in the ROM.
Figure 10:
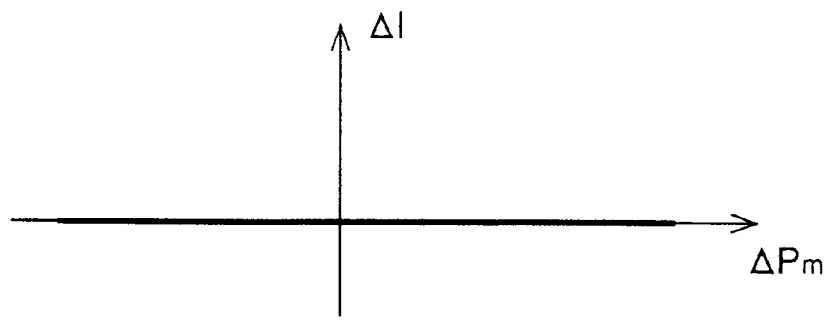
FIG. 10 is a graph indicating a data map for determining a desired amount of change of the electric current to hold the assisting hydraulic pressure, which data map is stored in the ROM.

The ROM 193 of the ECU 190 stores various programs and data maps, which include an assisting hydraulic pressure control routine illustrated in the flow chart of FIG. 6, an assisting pressure control mode selecting data map illustrated in the graph of FIG. 7, solenoid current determining data maps illustrated in the graphs of FIGS. 8–10, and an anti-lock braking pressure control routine.

There will next be described an operation of the assisting pressure control device 64 to control the fluid pressure in the rear assisting pressure chamber 50 of the master cylinder 14. This assisting pressure control operation is initiated when the master cylinder pressure Pm (fluid pressure in the pressurizing chamber 38 as detected by the master cylinder pressure sensor 204) has been increased to a predetermined control initiating threshold value Pm0. The assisting pressure control operation is effected such that an overall boosting ratio Rsp (servo ratio) of the hydraulic pressure source which is a ratio of the output of the first pressurizing piston 32 to the input force applied to the first pressurizing piston 32 is controlled to be a predetermined desired value γ.

The output force of the pressurizing piston 32 is an output of the master cylinder 14 which corresponds to the fluid pressure in the pressurizing chamber 36, 38. On the other hand, the input force of the pressurizing piston 32 is an output force of the booster 12 which is received by the piston 32 at its auxiliary piston 46. The pressurizing piston 32 also receives an assisting force corresponding to and based on the fluid pressure in the assisting pressure chamber 50. The pressurizing piston 32 is advanced by a sum of the output force of the booster 12 and the assisting force, so that the fluid pressure generated in the pressurizing chambers 36, 38 corresponds to the above-indicated sum. By controlling the assisting force based on the fluid pressure in the assisting pressure chamber 50, the overall boosting ratio Rsp (which is the ratio of the output of the master cylinder 14 to the output of the booster 12) is controlled.

Figure 13:
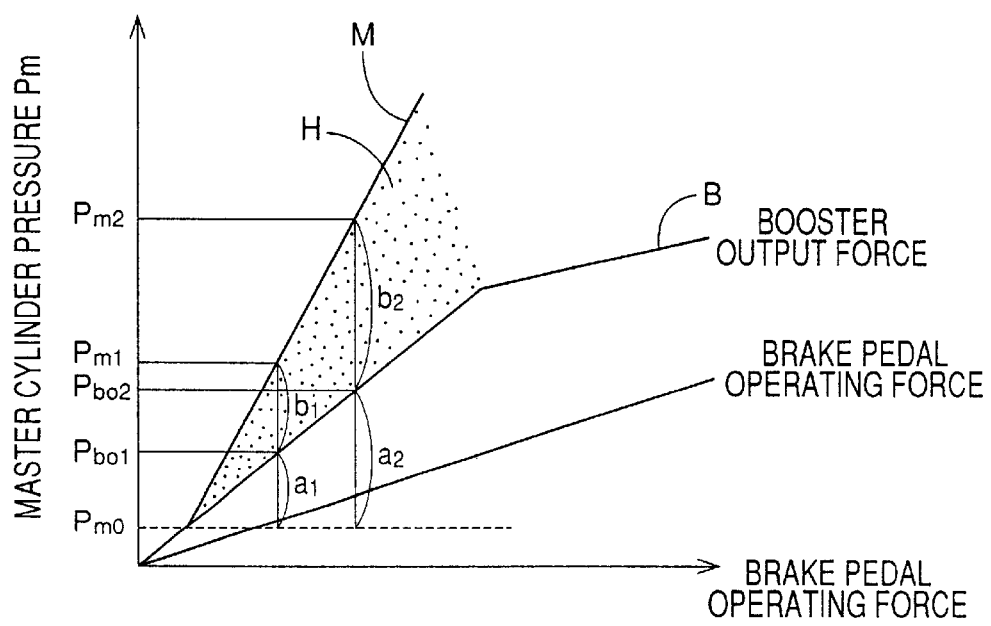
FIG. 13 is a graph schematically illustrating an assisting hydraulic pressure control in the braking system.

Referring to the graph of FIG. 13, a solid line M indicates the output of the master cylinder 14 and a solid line B indicates the output of the booster 12, while a region H indicates the assisting force based on the fluid pressure in the rear assisting pressure chamber 50 of the master cylinder 14. The overall boosting ratio Rsp is represented by the following equation (1):

$$Rsp=(Pm-Pbo)/(Pbo-Pm0) \quad (1)$$

As indicated above, the value Pm0 is the control initiating threshold value of the master cylinder pressure Pm. The value Pbo is a value of the master cylinder pressure Pm which corresponds to the output force of the booster 12. The pressure Pbo will be referred to as "booster output pressure Pbo".

The master cylinder pressure Pm, an assisting hydraulic pressure Ppa which is the fluid pressure in the assisting pressure chamber 50, and the booster output pressure Pbo have a relationship represented by the following equation (2):

$$Pm \times Am = Pbo \times Am + Ppa \times Ama \quad (2)$$

The value (Pm×Am) is the output of the master cylinder 14, and the value (Pbo×Am) is the output of the booster 12, while the value (Ppa×Ama) is an assisting force based on the assisting hydraulic pressure Ppa in the assisting pressure chamber 50. Therefore, the above equation shows that the output (Pm×Am) of the master cylinder 14 is equal to a sum of the output (Pbo×Am) of the booster 12 and the assisting force (Ppa×Ama) based on the assisting hydraulic pressure Ppa in the assisting pressure chamber 50. The value Am represents an effective pressure-receiving surface area of the pressurizing piston 34 which partially defines the pressurizing chamber 38, while the value Ama represents an effective pressure-receiving surface area of the piston 32 which partially defines the rear assisting pressure chamber 50.

The above equation (2) can be converted into the following equation (3) which represents the booster output pressure Pbo:

$$Pbo = Pm - Ppa \times Ama/Am \quad (3)$$

On the other hand, the assisting hydraulic pressure Ppa is determined by the electric current I to be applied to the solenoid coil 84 of the pressure control valve 70. Namely, the assisting hydraulic pressure Ppa is represented by the following equation (4):

$$Ppa = F(I) \quad (4)$$

By substituting the above equations (3) and (4) for the values Pbo and Ppa in the above equation (1), the following equation (5) is obtained:

$$Rsp = (F(I) \times Ama/Am)/(Pm - F(I) \times Ama/Am - Pm0) \quad (5)$$

The above equation (5) may be converted into the following equation (6) which represents the master cylinder pressure Pm:

$$Pm = \{(1/Rsp)+1\} \cdot F(I) \cdot Ama/Am + Pm0 \quad (6)$$

Since the overall boosting ratio Rsp is controlled to be equal to the predetermined value γ according to the present invention, the portion [{(1/Rsp)+1}·Ama/Am] in the above equation (6) is a coefficient, so that the relationship between the master cylinder pressure Pm and the electric current I is represented by a solid line indicated in the graph of FIG. 7.

In other words, the solid line in FIG. 7 represents the relationship between the electric current I and the master cylinder pressure Pm when the electric current I is controlled so that the overall boosting ratio or servo ratio Rsp is equal to the predetermined value γ while the master cylinder pressure Pm is equal to the control initiating threshold value Pm0 or higher. When the actual master cylinder pressure Pm follows the solid line, the overall boosting ratio Rsp is considered to be the predetermined value γ. In this sense, the solid line can be considered to represent a desired master cylinder pressure Pm'.

In the present embodiment, the electric current I to be applied to the solenoid coil 84 of the pressure control valve 70 of the assisting pressure control device 64 is controlled to regulate the assisting hydraulic pressure Ppa in the rear assisting pressure chamber 50, according to the data maps illustrated in the graphs of FIGS. 7–10.

Initially, one of a pressure increase mode, a pressure reduction mode and a pressure hold mode is selected according to the assisting pressure control mode determining data map shown in FIG. 7. The pressure increase mode is selected when a point represented by the electric current I and the actual value of the master cylinder pressure Pm as detected by the master cylinder pressure sensor 204 lies in a pressure increase region defined by the data map of FIG. 7. Similarly, the pressure hold mode is selected when the above-indicated point lies in a pressure hold region defined by the data map, and the pressure reduction mode is selected when the point lies in a pressure reduction region defined by the data map. A desired amount of change ΔI of the electric current I when the pressure increase mode is selected is determined according to the current determining data map of FIG. 8. Similarly, the desired amount of change ΔI when the pressure reduction mode is selected is determined according to the current determining data map of FIG. 9, and the desired amount of change ΔI when the pressure hold mode is selected is determined according to the current determining data map of FIG. 10.

The pressure increase region is a region in which the actual master cylinder pressure Pm is higher than the desired master cylinder pressure Pm' (indicated by the solid line in FIG. 7) by more than a predetermined first amount R1, namely, Pm>Pm'+R1. Where the point defined by the actual master cylinder pressure Pm and the electric current value I is in the pressure increase region, the actual master cylinder pressure Pm corresponding to the electric current I (assisting hydraulic pressure Ppa) is considerably higher than the desired value Pm', and the overall boosting ratio Rsp is lower than the predetermined value γ. In this case, therefore, the electric current I is increased to increase the assisting hydraulic pressure Ppa in the assisting pressure chamber 50, for thereby increasing the overall boosting ratio Rsp toward the predetermined value γ.

When the vehicle operator depresses the brake pedal 10 by an additional amount while the assisting hydraulic pressure Ppa (electric current I) is kept constant, for example, the actual master cylinder pressure Pm is increased. In this case, the overall boosting ratio Rsp is lowered below the predetermined value γ. According to the principle of this invention, the overall boosting ratio Rsp is increased toward the predetermined value γ by increasing the assisting hydraulic pressure Ppa in the assisting pressure chamber 50 by increasing the electric current I to be applied to the solenoid coil 84 of the pressure control valve 70.

Where the pressure increase mode is selected, the electric current I is determined by determining the desired amount of change ΔI of the electric current I according to the current determining data map of FIG. 8. The desired electric current I is obtained by adding the determined amount of change ΔI to the present value of the electric current I. That is, the desired electric current I is equal to (I+ΔI).

According to the current determining data map of FIG. 8 used in the pressure increase mode, the desired amount of change ΔI of the electric current is kept at an upper limit ΔIu1 after a rate of change ΔPm of the actual master cylinder pressure Pm has reached a predetermined first threshold value Su1. Namely, ΔI=ΔIu1 where ΔPm>Su1. Thus, the data map of FIG. 8 is formulated to prevent an abrupt increase of the electric current I.

Where the rate of change ΔPm of the actual master cylinder pressure Pm is in a range between the predetermined first threshold value Su1 and a predetermined second threshold value Su2 which is smaller than the first threshold value Su1, that is, where Su2≦ΔPm≦Su1, the desired amount of change ΔI is increased with an increase in the rate of change ΔPm. As described above, the actual master cylinder pressure Pm increases with an increase in the brake operating force (force applied to the brake pedal 10 by the operator), and the rate of increase ΔPm of the actual master cylinder pressure Pm increases with an increase in the rate of increase of the brake operating force, as long as the assisting hydraulic pressure Ppa in the assisting pressure chamber 50 is kept constant. By determining the desired amount of increase ΔI of the electric current I with the rate of increase ΔPm of the actual master cylinder pressure Pm, the desired amount of increase ΔI changes with the rate of increase of the brake operating force. Accordingly, the overall boosting ratio or servo ratio Rsp can be increased to the predetermined value γ at a rate corresponding to the rate of increase of the brake operating force, so that the overall boosting ratio Rsp can be suitably controlled.

Where the rate of change ΔPm of the actual master cylinder pressure Pm is in a range between the predetermined second threshold value Su2 and a predetermined third threshold value Su3 (smaller than Su2), that is, where Su3<ΔPm<Su2, the desired amount of change ΔI is kept at a predetermined value ΔIu0. Namely, the assisting hydraulic pressure Ppa in the assisting pressure chamber 50 is increased at a rate corresponding to the predetermined value ΔIu0. This predetermined value ΔIu0 of the amount of change ΔI is larger than an amount of change ΔI which would be determined according to the rate of change ΔPm as indicated by broken line in FIG. 8. This arrangement assures an increase of the assisting hydraulic pressure Ppa to increase the overall boosting ratio Rsp toward the predetermined value γ even when the absolute value of the rate of change ΔPm of the actual master cylinder pressure Pm is relatively small (between Su2 and Su3).

Where the determined desired amount of change ΔI of the electric current I to be applied to the solenoid coil 84 of the pressure control valve 70 is relatively small, the assisting hydraulic pressure Ppa in the assisting pressure chamber 50 may be increased by an amount corresponding to the determined desired amount of change ΔI. In the present embodiment, however, the desired amount of change ΔI is not determined to be smaller than ΔIu0, that is, is determined to be ΔIu0 even when the rate of change ΔPm is considerably low. This arrangement permits an increase in the assisting hydraulic pressure Ppa by an amount corresponding to the predetermined value ΔIu0, so that a considerably low rate of increase in the operating force acting on the brake pedal 10 will cause the overall boosting ratio Rsp to increase toward the predetermined value γ, making it possible to change the pressure control mode from the pressure increase mode to the pressure hold mode in a short time.

Where the rate of change ΔPm of the actual master cylinder pressure Pm is a negative value and is smaller than the third threshold value Su3, the desired amount of change ΔI is determined to be zero. Where the actual master cylinder pressure Pm is in the process of being reduced, the overall boosting ratio Rsp will be changed toward the predetermined value γ, without increasing the electric current I, even when the actual master cylinder pressure Pm is higher than the desired value Pm', that is, even when the pressure increase mode is selected.

The pressure reduction region is a region in which the actual master cylinder pressure Pm is lower than the desired master cylinder pressure Pm' (indicated by the solid line in FIG. 7) by more than a predetermined second amount R2, namely, Pm<Pm'−R2. Where the point defined by the actual master cylinder pressure Pm and the electric current value I is in the pressure reduction region, the actual master cylinder pressure Pm corresponding to the electric current I (assisting hydraulic pressure Ppa) is considerably lower than the desired value Pm1, and the overall boosting ratio Rsp is higher than the predetermined value γ. In this case, therefore, the electric current I is reduced to reduce the assisting hydraulic pressure Ppa in the assisting pressure chamber 50, for thereby reducing the overall boosting ratio Rsp toward the predetermined value γ.

When the vehicle operator releases the brake pedal 10 by a given amount while the assisting hydraulic pressure Ppa (electric current I) is kept constant, for example, the actual master cylinder pressure Pm is reduced. In this case, the overall boosting ratio Rsp is increased. According to the principle of this invention, the, overall boosting ratio Rsp is reduced toward the predetermined value γ by reducing the assisting hydraulic pressure Ppa by reducing the electric current I to be applied to the solenoid coil 84.

Where the pressure reduction mode is selected, the electric current I is determined by determining the desired amount of change ΔI of the electric current I according to the current determining data map of FIG. 9, as in the case where the pressure increase mode is selected. According to the current determining data map of FIG. 9 used in the pressure reduction mode, the desired amount of change ΔI of the electric current is kept at a lower limit ΔId1 after the rate of change ΔPm of the actual master cylinder pressure Pm has been reduced to a predetermined first threshold value Sd1 (a negative value indicating a rate of reduction of the pressure Pm). Namely, ΔI=ΔId1 where ΔPm<Sd1. Thus, the data map of FIG. 8 is formulated to prevent an abrupt reduction of the electric current I.

Where the rate of change ΔPm of the actual master cylinder pressure Pm is in a range between the predetermined first threshold value Sd1 and a predetermined second threshold value Sd2 (a negative value) which is larger than the first threshold value Sd1, that is, where Sd2≧ΔPm>Sd1, the desired amount of reduction ΔI is increased with an increase in the rate of reduction ΔPm. Where the rate of change ΔPm of the actual master cylinder pressure Pm is in a range between the predetermined second threshold value Sd2 and a predetermined third threshold value Sd3 (a positive value), that is, where Sd3>ΔPm>Sd2, namely, where the absolute value of the rate of change ΔPm is relatively small, the desired amount of reduction ΔI is kept at a predetermined value ΔId0. Where the rate of change ΔPm is larger than the predetermined third threshold value Sd3, that is, where ΔPm>Sd3, the desired rate of change ΔI is determined to be zero.

As in the pressure increase mode, the desired amount of change ΔI is determined to be the predetermined value ΔId0 where the absolute value of the rate of change ΔPm is relatively small in the predetermined range between Sd2 and Sd3. This arrangement permits a reduction in the assisting hydraulic pressure Ppa by an amount corresponding to the predetermined value ΔId0, so that a considerably low rate of reduction in the operating force acting on the brake pedal 10 will cause the overall boosting ratio Rsp to decrease toward the predetermined value γ, making it possible to change the pressure control mode from the pressure reduction mode to the pressure hold mode in a short time.

The pressure hold region is a region in which the actual master cylinder pressure Pm is considerably close to the desired value Pm', namely, Pm'−R2≦Pm≦Pm'+R1. In this case, the overall boosting ratio Rsp is considerably close to the predetermined value γ, so that the electric current I is held constant, that is, the desired amount of change ΔI is determined to be zero, as indicated in FIG. 10.

In the present braking system, the pump motor 68 is kept operated while the assisting hydraulic pressure Ppa in the assisting pressure chamber 50 is being controlled. That is, the pressure increasing pump 66 is kept operated irrespective of the selected pressure control mode. As described above, the anti-lock pressure control pumps 104 are also operated while the pressure increasing pump 66 is operated, since the single common pump motor 68 is used for driving the pumps 104 as well as the pump 66. However, no working fluid is usually stored in the reservoirs 120 unless an anti-lock pressure control operation is performed for any wheel having a locking tendency. Accordingly, the operations of the pumps 104 will not normally cause a supply of the fluid pressurized by the pumps 104 to the wheel brake cylinders 92. When an anti-lock pressure control operation is performed for any one of the wheel brake cylinders 92, the fluid pressure in that wheel brake cylinder 92 is controlled by suitably controlled the pressure holding valve 110 and the pressure reducing valve 130. This anti-lock pressure control operation may be performed concurrently with and independently of the control of the assisting hydraulic pressure in the rear assisting pressure chamber 50 of the master cylinder 14 by the assisting pressure control device 64.

Referring to the flow chart of FIG. 6, there will be described the assisting hydraulic pressure control routine. This routine is initiated with step S1 to detect the actual master cylinder pressure Pm on the basis of the output signal of the master cylinder pressure sensor 204. Then, the control flow goes to step S2 to determine whether the detected actual master cylinder pressure Pm is higher than the predetermined control initiating threshold Pm0. If an affirmative decision (YES) is obtained in step S2, the control flow goes to step S3. If a negative decision (NO) is obtained in step S2, the fluid pressure in the assisting pressure chamber 50 is not pressurized, that is, the electric current I is not applied to the solenoid coil 84 of the pressure control valve 70.

In step S3, one of the pressure increase, hold and reduction modes is selected according to the pressure control mode selecting data map of FIG. 7, and on the basis of the detected actual master cylinder pressure Pm. Then, step S4 is implemented to determine the desired amount of change ΔI of the electric current I according to one of the current determining data maps of FIGS. 8–10, which corresponds to the selected pressure control mode. The desired amount of electric current I is calculated by adding to the determined desired amount of change ΔI to the present electric current value I. Step S4 is followed by step S5 in which the calculated electric current I is applied to the solenoid coil 84 of the pressure control valve 70 through the appropriate driver circuit.

Figure 11:
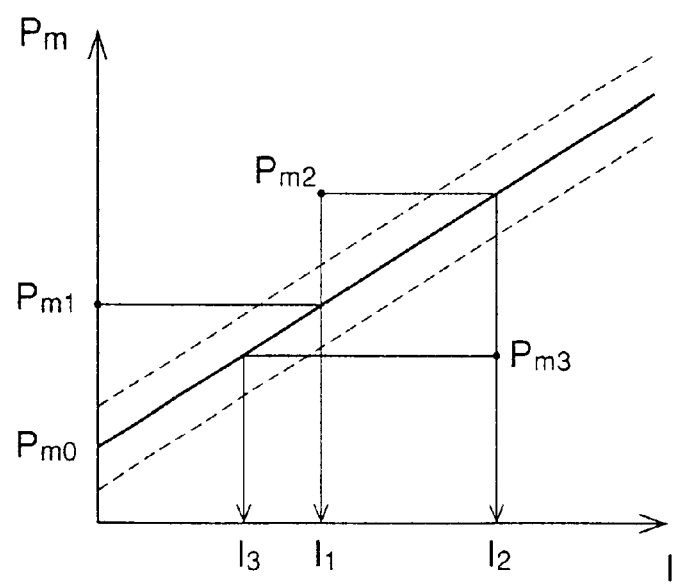
FIGS. 11 and 12 are graphs showing an example of control of the braking system.
Figure 12:
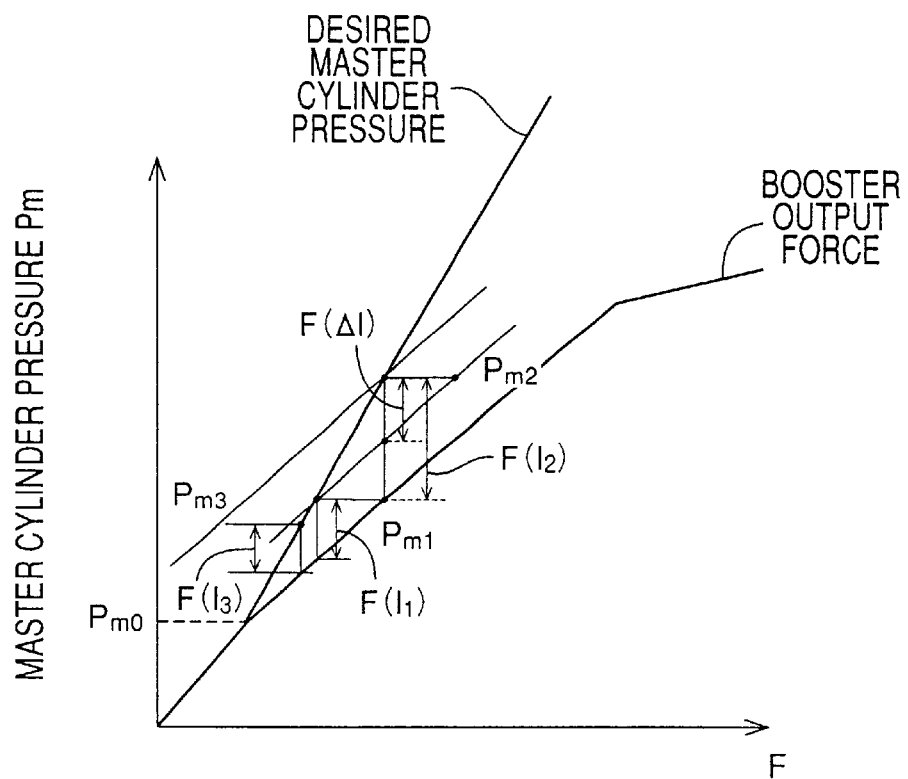

Referring to FIGS. 11 and 12, there will be described a specific example of control of the assisting hydraulic pressure Ppa in the assisting pressure chamber 50 by controlling the electric current I to be applied to the solenoid coil 84 of the pressure control valve 70 of the assisting pressure control device 64. For easier understanding, the graphs of FIGS. 11 and 12 show a typical or ideal case in which the vehicle operator adjusts the operating force acting on the brake pedal 10 during an increase of the overall boosting ration Rsp (during an increase of the assisting hydraulic pressure Ppa), so that the master cylinder pressure Pm (wheel braking force) is held at a desired value. Actually, however, a change in the assisting hydraulic pressure will cause a change in the master cylinder pressure Pm, and the overall boosting ratio Rsp will not be linearly changed to the predetermined value γ.

When the actual master cylinder pressure Pm is lower than the predetermined control initiating threshold value Pm0, the assisting hydraulic pressure in the assisting pressure chamber 50 is not controlled. When the actual master cylinder pressure Pm has been increased to a value Pm1 (FIG. 11) higher than the control initiating threshold value Pm0, as a result of a further increase in the brake operating force applied to the brake pedal 10 by the vehicle operator, the pressure increase mode is selected, and the desired amount of change ΔI of the electric current I is determined according to the data map of FIG. 8. Then, the electric current I to be applied to the solenoid coil 84 is calculated by adding the determined desired amount of change ΔI to the present value I, which is presently zero. The calculated electric current I is applied to the solenoid coil 84, so that the assisting hydraulic pressure in the pressure chamber 50 is accordingly increased, whereby the overall boosting ratio Rsp is increased toward the predetermined value γ. When the point represented by the actual master cylinder pressure Pm and the electric current value I has been moved into the pressure hold region, the pressure hold mode is selected, and the electric current I is held constant at I1 (FIG. 11).

When the actual master cylinder pressure Pm has been further increased to a value Pm2, as indicated in FIG. 11, the pressure increase mode is again selected, and the electric current I is increased to I2=I1+ΔI. When the actual cylinder pressure Pm is lowered to a value Pm3 with the electric current I held at I2, the pressure reduction mode is selected, and the electric current I is reduced from I2 to I3=I2+ΔI, with the value change ΔI being smaller than zero, whereby the overall boosting ratio Rsp is reduced. Accordingly, the pressure hold mode is selected.

As described above, the overall boosting ratio Rsp can be controlled to be almost equal to the predetermined value γ, by controlling the electric current I to be applied to the solenoid coil 84 of the pressure control valve 70. Since the control of the overall boosting ratio Rsp is based on only the detected actual master cylinder pressure Pm and the electric current I, the control can be effected with ease, without having to detect the amount of operation of the brake pedal 10 by the vehicle operator. Since a sensor for detecting the operating amount of the brake pedal 10 is not necessary, the control of the overall boosting ratio Rsp by controlling the electric current I does not push up the cost of manufacture of the braking system. Further, the control of the assisting hydraulic pressure by controlling the electric current I permits the overall boosting ratio Rsp to be higher than the boosting ratio of the booster 12. In addition, the control of the assisting hydraulic pressure in the assisting pressure chamber 50 can be initiated immediately after the detected actual master cylinder pressure Pm has reached the predetermined control initiating threshold, since the pump motor 68 is kept operated as long as the brake pedal 10 is in operation.

In the anti-lock braking pressure control operation, the pressure holding valve 110 and the pressure reducing valve 130 are suitably controlled so as to hold the amount of slip of each wheel in an optimum range.

When the anti-lock braking pressure control operation is initiated while the assisting hydraulic pressure in the pressure chamber 50 is not controlled, that is, while no electric current I is applied to the solenoid coil 84 of the pressure control valve 70, the pressurized fluid delivered from the delivery port of the pressure increasing pump 66 is returned to its suction port through the pressure control valve 70 which is held open. Accordingly, the pressurized fluid is not delivered from the pump 66 into the assisting pressure chamber 50, namely, the fluid in the pressure chamber 50 is not pressurized by the pump 66.

Where the anti-lock braking pressure control operation is initiated while the assisting hydraulic pressure is being controlled, the assisting hydraulic pressure may be continuously controlled in the same manner as used before the initiation of the anti-lock braking pressure control. Alternatively, the pressure hold mode may be selected as long as the anti-lock braking pressure control is effected. In this respect, it is noted that the controlling the assisting hydraulic pressure by the pressure control valve 70 has substantially no influence on the operation of the anti-lock pressure control pumps 104.

Since the single common pump motor 68 is used for operating both the pressure increasing pump 66 and the anti-lock pressure control pumps 104, the cost of manufacture of the braking system is reduced, and the ease of installation of the braking system on the vehicle is increased.

It will be understood from the foregoing description of the presently preferred embodiment of the invention that the braking hydraulic pressure source apparatus is principally constituted by the booster 12, master cylinder 14, and assisting pressure control device 64. As described above, the assisting pressure control device 64 includes not only the pressure increasing pump 66, pump motor 68 and pressure control valve 70, but also the electronic control unit (ECU) 190, more specifically, a portion of the ECU 190 assigned to execute the assisting hydraulic pressure control routine illustrated in the flow chart of FIG. 6.

It will be understood that the ROM 193 storing the data maps of FIGS. 7–10 and a portion of the ECU 190 assigned to implement steps S3 and S4 of the routine of FIG. 6 provide a major portion of an output-pressure-dependent pressure control device for controlling the assisting hydraulic pressure in the assisting pressure chamber 50 on the basis of the fluid pressure in the pressurizing chambers 36, 38. The above-indicated portion of the ECU 190 assigned to implement step S3 and S4 provides a major portion of a pressure increasing and reducing device for increasing the assisting hydraulic pressure if the assisting hydraulic pressure is lower than a desired value corresponding to the pressure in the pressurizing chambers 36, 38, and reducing the assisting hydraulic pressure if the assisting hydraulic pressure is higher than the above-indicated desired value corresponding to the pressure in the pressurizing chambers 36, 38. The above-indicated portion of the ECU 190 assigned to implement steps S3 and S4 also may be considered to provide a pressure increasing and reducing device for increasing the assisting hydraulic pressure if the fluid pressure in the front pressurizing chambers 36, 38 is higher than a desired value by more than a predetermined first amount, and reducing the assisting hydraulic pressure if the fluid pressure in the front pressurizing chambers 36, 38 is lower than the above-indicated desired value by more than a predetermined second amount. In this case, the desired value of the assisting hydraulic pressure is determined by the actual value of the assisting hydraulic pressure and the predetermined value of the boosting ratio.

It will further be understood that the ROM 193 storing the data maps of FIGS. 8–10 and a portion of the ECU 190 assigned to implement step S4 provide a major portion of an output-change-rate-dependent pressure control device for controlling the assisting hydraulic pressure on the basis of the rate of change of the pressure in the pressurizing chambers 36, 38. This output-change-rate-dependent pressure control device also serves as a major portion of an output-change-rate-dependent assisting pressure change rate control device for controlling the rate of change of the assisting hydraulic pressure on the basis of the rate of change of the pressure of the fluid in the front pressurizing chambers 36, 38. The ROM 193 and the portion of the ECU 190 assigned to implement step S4 also provide a major portion of an assisting pressure change rate control device for controlling the rate of change of the assisting hydraulic pressure such that the rate of change of the assisting hydraulic pressure is held at a predetermined constant value while the rate of change of the pressure in the front pressurizing chambers 36, 38 is in a predetermined range, and such that the rate of change of the assisting hydraulic pressure changes with the rate of change of the pressure in the pressurizing chambers 36, 38 while the rate of change of the pressure in the pressurizing chambers is not in the above-indicated predetermined range.

It will also be understood that a portion of the ECU 190 assigned to implement steps S4 and S4 of FIG. 6 provides a major portion of a current control device for controlling an electric current to the pressure control valve 70. The rear assisting pressure chamber 50 of the master cylinder 14 and the assisting pressure control device 64 may be considered to provide a major portion of an electrically controlled booster. In this case, a mechanically controlled booster in the form of the booster 12 and the electrically controlled booster may be considered to be disposed in series with each other between the pressurizing piston 32 and the brake pedal 10. In this arrangement, the operating force acting on the brake pedal 10 is boosted by both the booster 12 and the electrically controlled booster, so that the overall boosting ratio can be made higher than the boosting ratio of the booster 12, whereby the required brake operating force for providing a desired braking force is reduced. Further, the present arrangement provides a desired boosting characteristic.

It will also be understood that the pressure increasing valves 110, pressure reducing valves 130, anti-lock pressure control pumps 104, and a portion of the ECU 190 assigned to control the fluid pressures in the wheel brake cylinders 92 provide a major portion of an independent pressure control device for controlling the fluid pressure in the wheel brake cylinders 92.

In the illustrated embodiment, the control initiating threshold value Pm0 of the master cylinder pressure Pm is intermediate between zero and a value which is to be detected when the boosting limit of the booster 12 has been reached. However, the threshold value Pm0 may be zero or the value Pm to be detected when the boosting limit of the booster 12 has been reached. Where the threshold value Pm0 is zero, the assisting hydraulic pressure Ppa in the assisting pressure chamber 50 is always controlled as long as the brake pedal 10 is in operation. It is noted that the booster 12 is not essential. That is, the brake operating force can be boosted by controlling the assisting hydraulic pressure, so as to control the boosting ratio Rsp which is a ratio of the output of the master cylinder 14 to the brake operating force. Further, the determination of the desired amount of change ΔI according to the data maps of FIGS. 8 and 9 when the pressure increase mode and the pressure reduction mode are selected is not essential. For instance, the data maps of FIGS. 8 and 9 may be modified such that the desired amount of change ΔI is changed as indicated by broken lines in FIGS. 8 and 9, also when the rate of change of the master cylinder pressure ΔPm is in the predetermined range between Su2 and Su3, or between Sd2 and Sd3. In particular, the desired amount of change (reduction) ΔI is changed along the broken line in FIG. 9 when the pressure reduction mode is selected, the assisting hydraulic pressure can be reduced with the desired amount of change ΔI. Further, it is not essential to determine the desired amount of change ΔI to be kept at the upper or limit ΔIu1, ΔId1, when the absolute value of the rate of increase or reduction ΔPm of the actual master cylinder pressure Pm is larger than the predetermined first value Su1, Sd1.

The anti-lock braking pressure control operation may be effected by using the assisting hydraulic pressure, rather than by using the pressure holding and reducing valves 110, 130. Further, the traction control of the drive wheels by activating the corresponding wheel brake cylinders 92, the vehicle running stability control by activating the appropriate wheel brake cylinders 92 and other automatic brake application control may be achieved by controlling the assisting hydraulic pressure in the pressure chamber 50.

Although the illustrated embodiment is arranged such that the pump motor 68 is kept operated during the control of the assisting hydraulic pressure the pump motor 68 may be turned off when the pressure reduction mode or the pressure hold mode is selected while an anti-lock braking pressure control operation is not effected. In this case, the amount of energy consumption by the braking system can be reduced, owing to the elimination of the unnecessary operation of the pump motor 68. Further, the pump motor 68 may be operated only while the assisting hydraulic pressure is controlled or the anti-lock braking pressure control is effected, so that the wasting of the energy is minimized.

It is also noted that the arrangement of the braking system is not limited to that of the illustrated embodiment. For instance, the braking system need not be constructed with an anti-lock braking pressure control device. While only the pressure control valve 70 in the form of a pressure reducing control valve is used in the assisting pressure control device 64, there may be provided a pressure increasing control valve between the pressure increasing pump 66 and the assisting pressure control chamber 50.

While the presently preferred embodiment of this invention has been described above by reference to the accompanying drawings, for illustrative purpose only, it is to be understood that the present invention may be embodied with various other changes, modifications and improvements, such as those described above in the SUMMARY OF THE INVENTION, which may occur to those skilled in the art.

What is claimed is:

1. A braking hydraulic pressure source apparatus comprising:

a cylinder housing having an open end;

an input member operable to receive an input force based on an operation of a brake operating member;

a pressurizing piston fluid-tightly and slidably received within said cylinder housing and cooperating with said cylinder housing to define a front pressurizing chamber and a rear assisting pressure chamber on respective front and rear sides of said pressurizing piston, and said pressurizing piston being advanced by said input force received from said input member in response to said operation of said brake operating member, to pressurize a working fluid in said front pressurizing chamber;

a closure member fluid-tightly closing said open end of said cylinder housing and cooperating with said cylinder housing and said pressurizing piston to define said rear assisting pressure chamber, said input member fluid-tightly and slidably extending through said closure member such that said input force is applicable directly to said pressurizing piston rather than via said working fluid in said rear assisting pressure chamber, irrespective of an amount of said input force; and an electrically controlled assisting pressure control device for controlling an assisting hydraulic pressure which is a pressure of the working fluid in said rear assisting pressure chamber, such that a boosting ratio which is a ratio of an output of said pressurizing piston on an input of said pressurizing piston is controlled to be a predetermined value.

2. A braking hydraulic pressure source apparatus according to claim 1, wherein said assisting pressure control device includes an output-pressure-dependent pressure control device for controlling said assisting hydraulic pressure in said rear assisting pressure chamber on the basis of a pressure of the working fluid in said front pressurizing chamber.

3. A braking hydraulic pressure source apparatus according to claim 1, wherein said assisting pressure control device includes a pressure increasing and reducing device for increasing said assisting hydraulic pressure if said assisting hydraulic pressure is lower than a desired value corresponding to a pressure of the working fluid in said front pressurizing chamber, and reducing said assisting hydraulic pressure if said assisting hydraulic pressure is higher than said desired value.

4. A braking hydraulic pressure source apparatus according to claims 3, wherein said assisting pressure control device further includes a pressure holding device for holding said assisting hydraulic pressure if said assisting hydraulic pressure is almost equal to said desired value.

5. A braking hydraulic pressure source apparatus according to claim 1, wherein said assisting pressure control device further includes a pressure increasing and reducing device for increasing said assisting hydraulic pressure if a pressure of the working fluid in said front pressurizing chamber is higher than a desired value by more than a predetermined first amount, and reducing said assisting hydraulic pressure if the pressure of the working fluid in said front pressurizing chamber is lower than said desired value by more than a predetermined second amount, said desired value being determined by an actual value of said assisting hydraulic pressure and said predetermined value of said boosting ratio.

6. A braking hydraulic pressure source apparatus according to claim 5, wherein said assisting pressure control device further includes a pressure holding device for holding said assisting hydraulic pressure if the pressure of the fluid in said front pressurizing chamber is in a range determined by said desired value thereof and said predetermined first and second amounts.

7. A braking hydraulic pressure source apparatus according to claim 1, wherein said assisting pressure control device includes an output-change-rate-dependent pressure control device for controlling said assisting hydraulic pressure on the basis of a rate of change of the pressure of the working fluid in said front pressurizing chamber.

8. A braking hydraulic pressure source apparatus according to claim 1 wherein said assisting pressure control device includes an output-change-rate-dependent assisting pressure change rate control device for controlling a rate of change of said assisting hydraulic pressure on the basis of a rate of change of the pressure of the working fluid in said front pressurizing chamber.

9. A braking hydraulic pressure source apparatus according to claim 1, wherein said assisting pressure control device includes an assisting pressure change rate control device for controlling a rate of change of said assisting hydraulic pressure such that the rate of change of said assisting hydraulic pressure is held at a predetermined constant value while the rate of change of the pressure of the working fluid in said front pressurizing chamber is held in a predetermined range, and such that the rate of change of said assisting hydraulic pressure changes with the rate of change of the pressure in the front pressurizing chamber while the rate of change of the pressure of the working fluid in said front pressurizing chambers is not in said predetermined rate.

10. A braking hydraulic pressure source apparatus according to claim 9, wherein said rate of change of said assisting hydraulic pressure while the rate of change of said pressure of the working fluid in said front pressurizing chamber is lower than a predetermined value is made higher than a value which corresponds to the rate of change of the pressure of the working fluid in said front pressurizing chamber.

11. A braking hydraulic pressure source apparatus according to claim 1, wherein said assisting pressure control device comprises an electrically operated hydraulic power source including a hydraulic pump connected to said rear assisting pressure chamber, and an electric motor for driving said hydraulic pump.

12. A braking hydraulic pressure source apparatus according to claim 1, wherein said assisting pressure control device a pressure control valve device including (a) a solenoid-operated pressure control valve for controlling said assisting hydraulic pressure in said rear assisting pressure chamber according to an electric current to be applied to said pressure control valve, and (b) a current control device for controlling the electric current to be applied to said solenoid-operated pressure control valve.

13. A braking hydraulic pressure source apparatus according to claim 12, wherein said solenoid-operated pressure control device includes a housing having a valve seat, a valve member movable toward and away from said valve seat, and an electromagnetic force generating device for generating an electromagnetic force acting on said valve member, depending upon an electric current to be applied to said electromagnetic force generating device, and wherein said current control device includes a device for changing said electric current to be applied to said electromagnetic force generating device, at a predetermined rate while the rate of change of the pressure of the working fluid in said rear assisting pressure chamber is lower than a predetermined lower limit.

14. A braking hydraulic pressure source apparatus according to claim 1, further comprising a mechanically controlled booster interconnected between said brake operating member and said pressurizing piston, for boosting an operating force acting on said brake operating member, said booster having a mechanically operated control valve for controlling a pressure of a fluid by which said operating force is boosted so that the boosted operating force is applied to said pressurizing piston.

15. A braking hydraulic pressure source apparatus according to claim 1, wherein said assisting pressure control device includes a device for initiating an operation to control said assisting hydraulic pressure in said rear assisting pressure chamber when the pressure of the working fluid in said front pressurizing chamber (36, 38) has been increased to a predetermined control initiating threshold value.

16. A braking hydraulic pressure source device according to claim 1, wherein said assisting pressure control device includes a pressure control mode selecting portion for selecting a pressure increase mode when said assisting hydraulic pressure is lower than a desired value corresponding to the pressure of the working fluid in said front pressurizing chamber, a pressure reduction mode when the assisting hydraulic pressure is higher than said desired value, and a pressure hold mode when the assisting hydraulic pressure is almost equal to said desired value, said assisting pressure control device further including a pressure control portion for increasing and reducing said assisting hydraulic pressure when said pressure increase and reduction modes are selected, respectively, so that said pressure increase and reduction modes are changed to said pressure hold mode, said pressure control portion reducing said assisting hydraulic pressure when said pressure reduction mode is selected.

17. A braking system for braking a wheel of an automotive vehicle, comprising:
   a braking hydraulic pressure source apparatus according to any one of claims 1–16;
   a wheel brake cylinder connected to said front pressurizing chamber of said braking hydraulic pressure source apparatus and operable for braking the wheel; and
   an independent pressure control device for controlling a pressure of the working fluid in said wheel brake cylinder, independently of the pressure of the working fluid in said front pressurizing chamber,
   and wherein said braking hydraulic pressure source apparatus includes an assisting pressure control pump connected to said rear assisting pressure chamber, and said independent pressure control device includes a reservoir for storing the working fluid discharged from said wheel brake cylinder, an independent pressure control pump for pressurizing the working fluid received from said reservoir, and an electric motor for driving said independent pressure control device, said electric motor being also used by said braking hydraulic pressure source apparatus, for driving said assisting pressure control pump.

18. A braking system for braking a wheel of an automotive vehicle, comprising:

a braking hydraulic pressure source apparatus including a (1) cylinder housing having an open end, (2) an input member operable to receive an input force based on an operation of a brake operating member, (3) a pressurizing piston fluid-tightly and slidably received within said cylinder housing and cooperating with said cylinder housing to define a front pressurizing chamber and a rear assisting pressure chamber on respective front and rear sides of said pressurizing piston, said pressurizing piston being advanced by said input force received from said input member in response to said operation of said brake operating member, to pressurize a working fluid in said front pressurizing chamber, (4) a closure member fluid-tightly closing said open end of said cylinder housing and cooperating with said cylinder housing and said pressurizing piston to define said rear assisting pressure chamber, said input member fluid-tightly and slidably extending through said closure member such that said input force is applicable directly to said pressurizing piston rather than via said working fluid in said rear assisting pressure chamber, irrespective of an amount of said input force, and (5) an assisting pressure control pump connected to said rear assisting pressure chamber;

a wheel brake cylinder connected to said front pressurizing chamber of said braking hydraulic pressure source apparatus and operable for braking the wheel; and an independent pressure control device for controlling a pressure of the working fluid in said wheel braking cylinder, independently of the pressure of the working fluid in said wheel braking cylinder, independently of the working fluid in said front pressurizing chamber,
and wherein the independent pressure control device includes a reservoir for storing the working fluid discharged from the wheel brake cylinder, an independent pressure control pump for pressurizing the working fluid received from the reservoir, and an electric motor for driving the independent pressure control device, the electric motor being also used by the braking hydraulic pressure source apparatus, for driving the assisting pressure control pump.

* * * * *